(12) United States Patent
Murasaki et al.

(10) Patent No.: US 10,859,961 B2
(45) Date of Patent: *Dec. 8, 2020

(54) DRIVE TRANSMISSION DEVICE AND IMAGE FORMING APPARATUS

(71) Applicant: CANON KABUSHIKI KAISHA, Tokyo (JP)

(72) Inventors: Satoshi Murasaki, Numazu (JP); Motoyasu Muramatsu, Susono (JP); Tsuyoshi Nagasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,503

(22) Filed: Oct. 30, 2019

(65) Prior Publication Data
US 2020/0064769 A1 Feb. 27, 2020

Related U.S. Application Data

(62) Division of application No. 15/976,186, filed on May 10, 2018, now Pat. No. 10,496,026.

(30) Foreign Application Priority Data

May 12, 2017 (JP) .................................. 2017-095484
Feb. 20, 2018 (JP) .................................. 2018-027517

(51) Int. Cl.
*G03G 15/20* (2006.01)
*G03G 15/00* (2006.01)
*F16H 55/18* (2006.01)

(52) U.S. Cl.
CPC ........... *G03G 15/757* (2013.01); *F16H 55/18* (2013.01); *G03G 15/2032* (2013.01); *G03G 15/2064* (2013.01); *G03G 2221/1657* (2013.01)

(58) Field of Classification Search
CPC ....................... G03G 15/2032; G03G 15/2035
(Continued)

(56) References Cited

U.S. PATENT DOCUMENTS 9,535,389 B2     1/2017  Muramatsu et al.
10,496,026 B2 *  12/2019 Murasaki et al. . G03G 15/2064
(Continued)

FOREIGN PATENT DOCUMENTS

EP       2924513 A1    9/2015
JP     2005157112 A    6/2005
(Continued)

OTHER PUBLICATIONS

European Search Report issued in corresponding European Application No. EP 18167906.9 dated Jul. 27, 2018.
(Continued)

*Primary Examiner* — William J Royer
(74) *Attorney, Agent, or Firm* — Venable LLP

(57) ABSTRACT

A drive transmission device includes a first gear, a cam configured to rotate in interrelation with rotation of the first gear and capable of changing a state of two members between a pressed state and a pressure-released state, a pressing member configured to press the cam, and a second gear configured to transmit drive to the first gear in engagement with the first gear. At least one of the first and second gears includes first teeth provided at positions corresponding to an engaging region in which the first gear is engaged with the second gear when the state of the two members is changed from the pressure-released state to the pressed state and includes second teeth provided at positions corresponding to a region other than the engaging region. Tooth thicknesses of the first teeth are thicker than tooth thicknesses of the second teeth.

20 Claims, 14 Drawing Sheets

(58) Field of Classification Search
USPC .................. 399/122, 124, 126, 320, 328
See application file for complete search history.

(56) References Cited

U.S. PATENT DOCUMENTS

| | | |
|---|---|---|
| 2013/0071152 A1 | 3/2013 | Fujiwara et al. |
| 2015/0226303 A1 | 8/2015 | Dumanski |
| 2018/0333974 A1 | 11/2018 | Yamano et al. |

FOREIGN PATENT DOCUMENTS

| | | |
|---|---|---|
| JP | 2013045026 A | 3/2013 |
| JP | 2015087701 A | 5/2015 |

OTHER PUBLICATIONS

European Office Action issued in corresponding European Application No. EP 18167906.9 dated Dec. 13, 2019.

* cited by examiner (a)

(b)

(a)

(b)

(a)

| SPUR GEAR | |
|---|---|
| TOOTH PROFILE | FULL |
| ADDENDUM coe. | 1 |
| DEDENDUM coe. | 1.25 |
| MODULE | 1.5 |
| PRESSURE ANGLE | 20° |
| NUMBER OF TEETH | 14 (10 TEETH) |
| REF. PITCH DIA. | 21mm |
| ADDENUM MOD. | 0.27mm |
| RACK SHIFT COEFFICIENT | (0.18) |
| R. OF ROOT OF T. | (R0.2mm ±0.05) |
| GVN N. OF TEETH | 2 |
| BASE T. OF TEETH | 7.121mm $_{-0.1}^{0}$ |

(b)

| SPUR GEAR | |
|---|---|
| TOOTH PROFILE | FULL |
| ADDENDUM coe. | 1 |
| DEDENDUM coe. | 1.25 |
| MODULE | 1.5 |
| PRESSURE ANGLE | 20° |
| NUMBER OF TEETH | 14 (4 TEETH) |
| REF. PITCH DIA. | 21mm |
| ADDENUM MOD. | 0.77mm |
| RACK SHIFT COEFFICIENT | (0.513) |
| R. OF ROOT OF T. | (R0.2mm ±0.05) |
| GVN N. OF TEETH | 3 |
| BASE T. OF TEETH | 11.891mm $_{-0.1}^{0}$ |

Fig. 16

DRIVE TRANSMISSION DEVICE AND IMAGE FORMING APPARATUS

CROSS-REFERENCE TO RELATED APPLICATIONS

This application is a divisional application of U.S. patent application Ser. No. 15/976,186, filed May 10, 2018, which claims the benefit of Japanese Patent Application Nos. 2017-095484, filed May 12, 2017, and 2018-027517, filed Feb. 20, 2018, the entire disclosures of which are all hereby incorporated by reference herein

FIELD OF THE INVENTION AND RELATED ART

The present invention relates to a drive transmission device and an image forming apparatus, such as a copying machine or a printer, including the drive transmission device.

In the image forming apparatus such as the copying machine or the printer, various mounting and demounting units detachably mountable to an apparatus main assembly are provided in order to improve operativity and a maintenance property. Also a fixing unit for fixing a developer image on a recording material and an intermediary transfer unit for primary transferring the developer image formed on a surface of a photosensitive drum are provided detachably mountable to the apparatus main assembly.

A load of several N to several tens of N is exerted on a press contact nip such as a fixing nip of the fixing unit or a primary transfer nip of the intermediary transfer unit. For this reason, when these units are left standing for a long term in a pressed state, permanent deformation generates in an elastic layer at the press contact nip, so that even when the load at the press contact nip is released (eliminated), the deformation of the elastic layer is not returned to an original state. As a drive transmission device for stably and reliably transmitting drive (driving force) to the mounting and demounting unit detachably mountable to the apparatus main assembly, a coupling, a swingable gear or the like is used.

Japanese Laid Open Patent Application (JP A) 2005 157112 discloses that a driving source is reversely rotated depending on an amount of play of a coupling, an amount of backlash of a driving system or an amount of rotation until the coupling is disconnected (disengaged) with respect to an axial direction. As a result, a resistance of the coupling during a spacing (separating) operation can be alleviated. In JP A 2013 045026, a drive transmission device in which a driving side gear is provided is supported by a frame member in a cantilever state and is provided swingably along an axial center direction of the driving side gear with a supporting portion thereof as a fulcrum, so that the driving side gear engages with a driven side gear. As a result, a flexible property of the driving side gear is ensured, so that engagement of the gears becomes smooth against a mounting error and a load fluctuation.

In JP-A 2015-087701, a pressure of a pressure generating member is adjusted by changing a rotation angle of a cam. When two outer peripheral points of the cam contact a first member and a second member by rotation of the cam, a rotational force of the cam is cancelled by the pressure of the pressure generating member. As a result, generation of impact noise during pressure application is prevented.

Even when the load at the press contact nip such as the fixing nip of the fixing unit or the primary transfer nip of the intermediary transfer unit is released, the deformation of the elastic layer is not returned to the original state. In order to prevent this phenomenon, a pressure changing device using a pressure releasing cam is provided for automatically eliminating a press contact state at the press contact nip in a period other than during image formation. When the drive transmission is carried out so that a state of the press contact nip is changed from a pressed state to a pressure released state in the mounting and demounting unit detachably mountable to the apparatus main assembly, a force generates in a direction of drawing the mounting and demounting unit to the apparatus main assembly, and therefore, the drive transmitting gears reliably engage with each other.

On the other hand, when the drive transmission is carried out so that the state of the press-contact nip is changed from the pressure-released state to the pressed state, the pressure-releasing cam is rotated in advance by the pressure from the pressure changing device. For this reason, a force for outwardly moving the mounting and demounting relative to the apparatus main assembly generates, so that the impact noise during the pressure application becomes large due to play of the drive transmitting gears. At this time, in order to reliably receive a rotational force of the pressure-releasing cam rotating in advance, an increase in rigidity of the mounting and demounting unit is required, and therefore, led to increases in size and cost. Further, there is also a liability that when the mounting and demounting unit is mounted in the apparatus main assembly, tooth tops of the drive transmitting gears abut against each other and thus a mounting operation is obstructed.

SUMMARY OF THE INVENTION

The present invention has solved the above-described problem. A principal object of the present invention is to provide a drive transmission device in which an engaging performance of gears for transmitting drive (driving force) to a cam capable of changing a pressed state between two members is improved.

According to an aspect of the present invention, there is provided a drive transmission device comprising: a first gear; a cam configured to rotate in interrelation with rotation of the first gear and capable of changing a state of two members between a pressed state and a pressure-released state; a pressing member configured to press the cam; and a second gear configured to transmit drive to the first gear in engagement with the first gear, wherein at least one of the first gear and the second gear includes a plurality of first teeth provided at positions corresponding to an engaging region in which the first gear is engaged with the second gear when the state of the two members is changed from the pressure-released state to the pressed state and includes a plurality of second teeth provided at positions corresponding to a region other than the engaging region, and wherein tooth thicknesses of the first teeth are thicker than tooth thicknesses of the second teeth.

Further features of the present invention will become apparent from the following description of exemplary embodiments with reference to the attached drawings.

Figure 10:
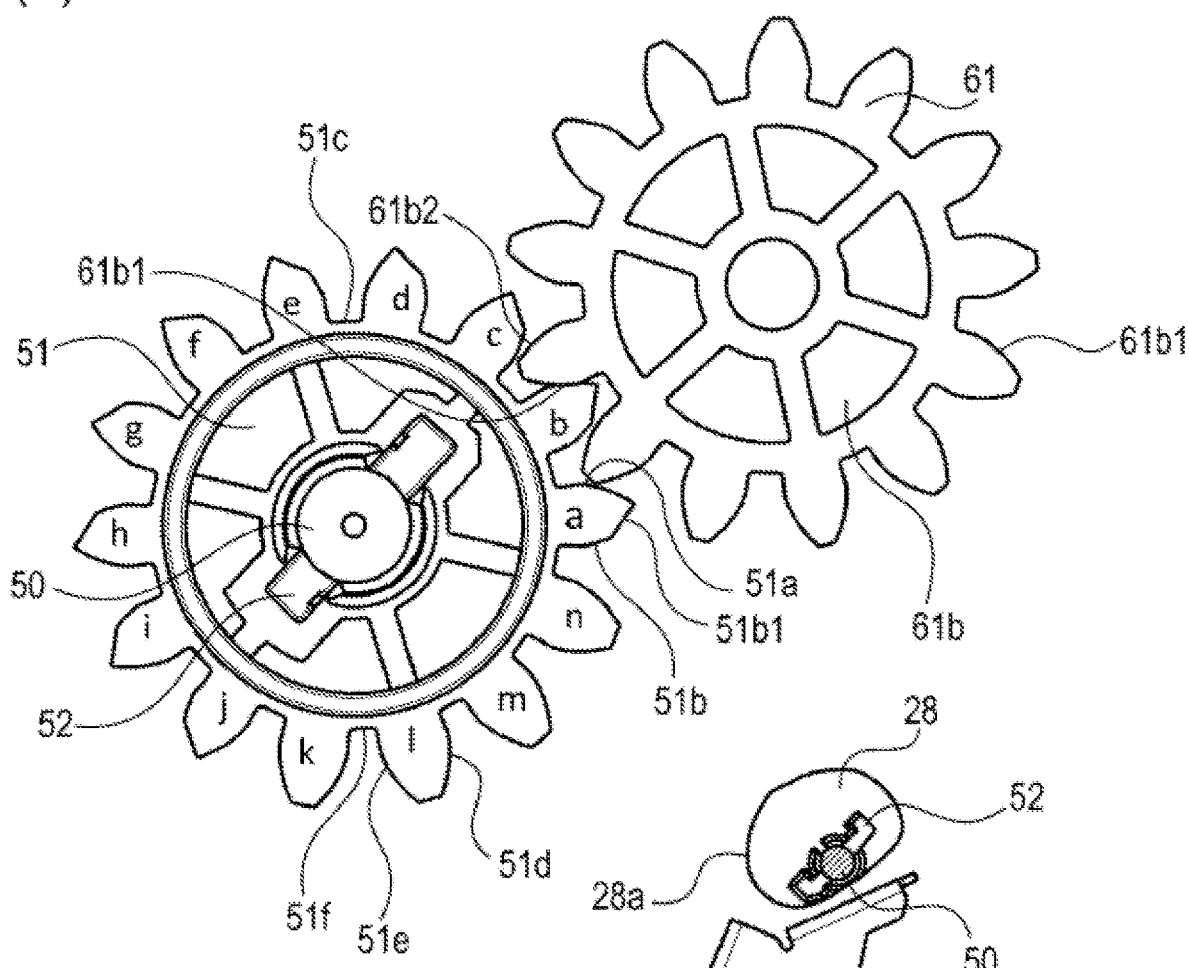

Part (a) of FIG. 10 is a side illustration showing an engaging state between transmission gears in a pressed state between the heating unit and the pressing roller, and part (b) of FIG. 10 is a side illustration showing a state of the cam member in the pressed state between the heating unit and the pressing roller.

Figure 11:
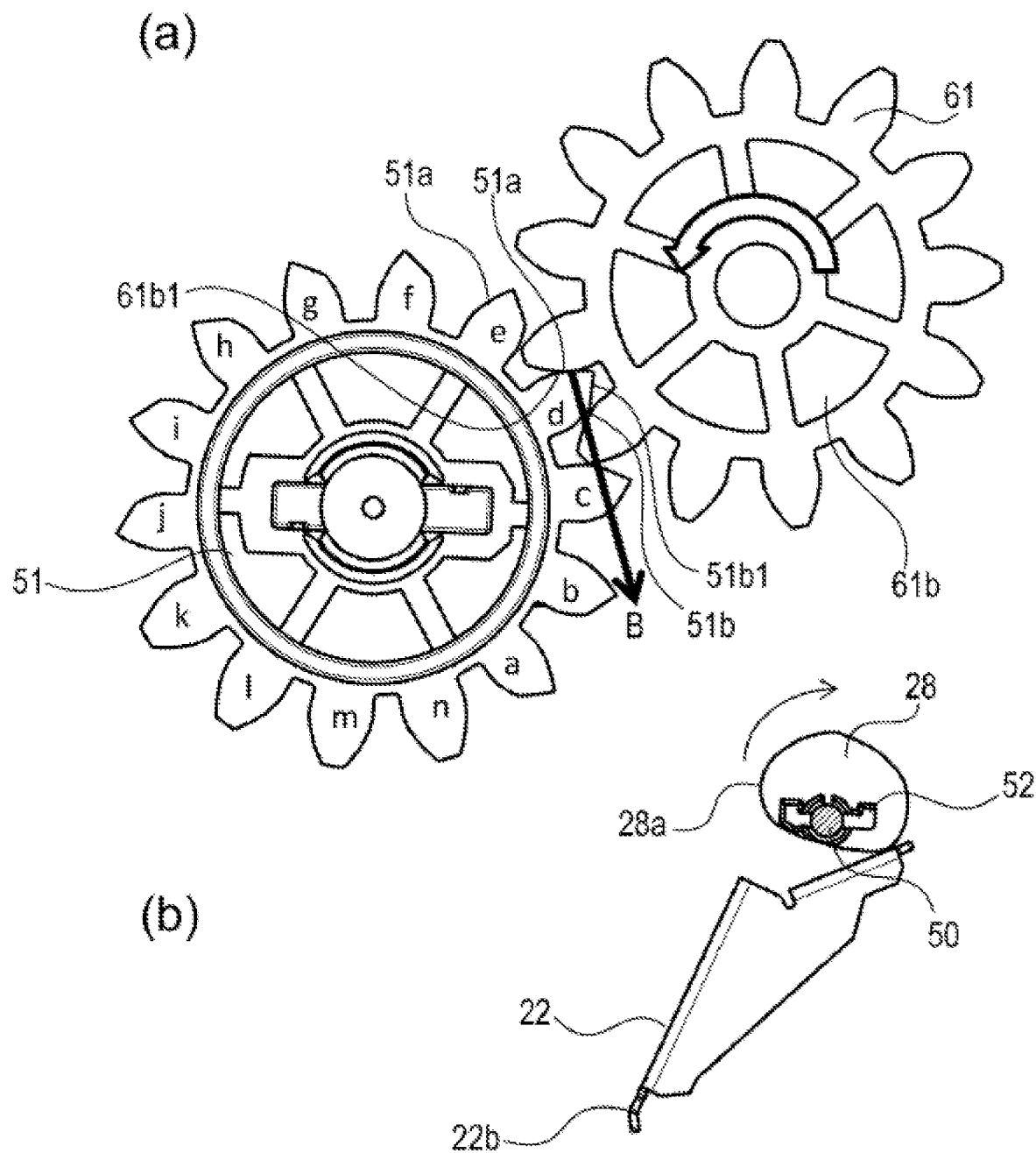

Part (a) of FIG. 11 is a side illustration showing an engaging state between the transmission gears during a change of a state between the heating unit and the pressing roller from the pressed state to a pressure released state, and part (b) of FIG. 11 is a side illustration showing a state of the cam member during the change of the state between the heating unit and the pressing roller from the pressed state to the pressure released state.

Figure 12:
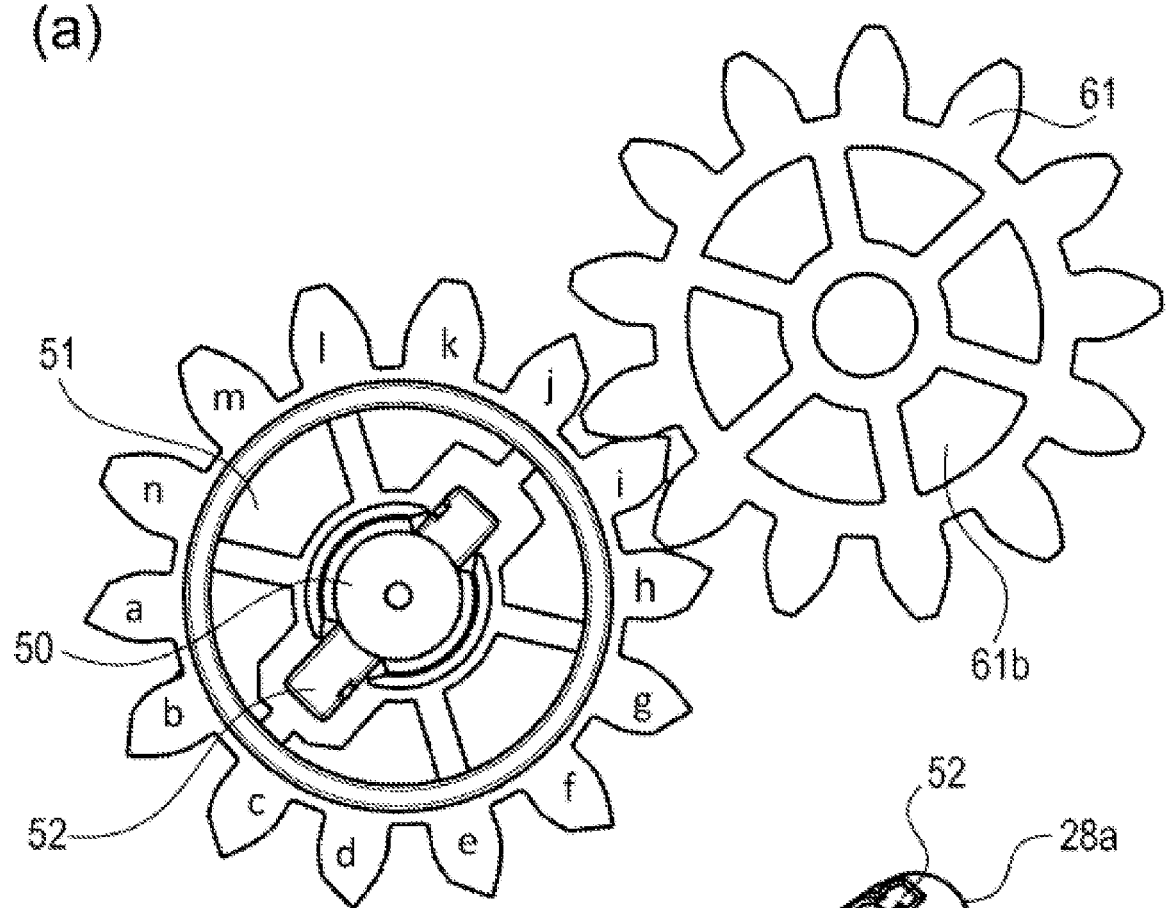
Figure 12:
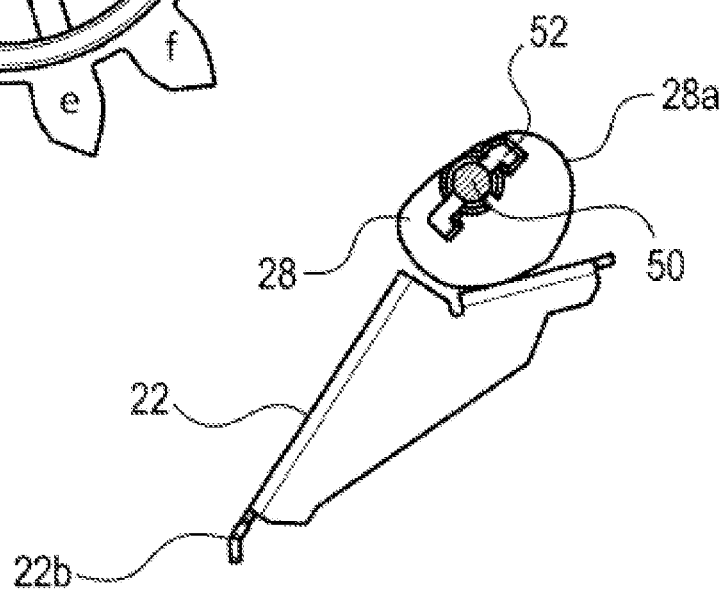

Part (a) of FIG. 12 is a side illustration showing an engaging state between transmission gears in the pressure-released state between the heating unit and the pressing roller, and part (b) of FIG. 12 is a side illustration showing a state of the cam member in the pressure-released state between the heating unit and the pressing roller.

Figure 13:
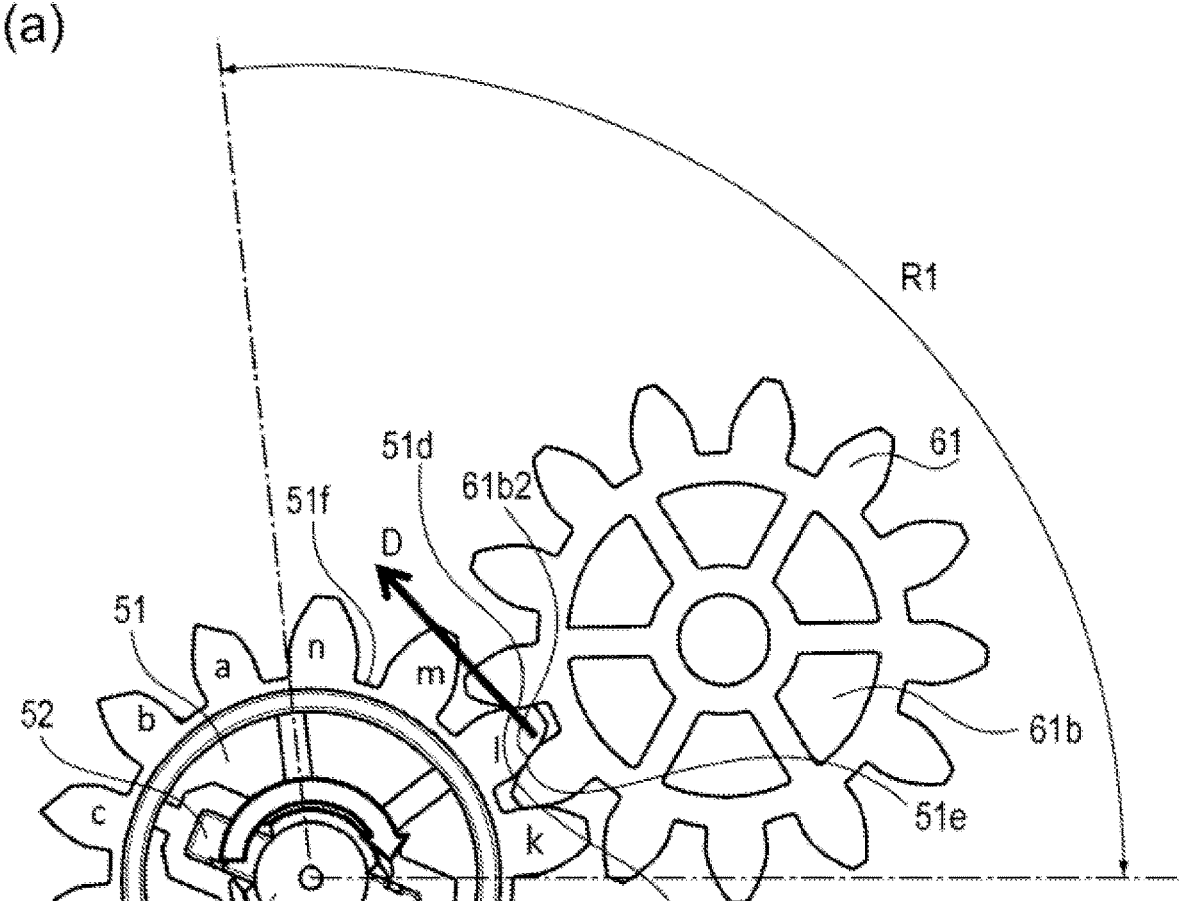
Figure 13:
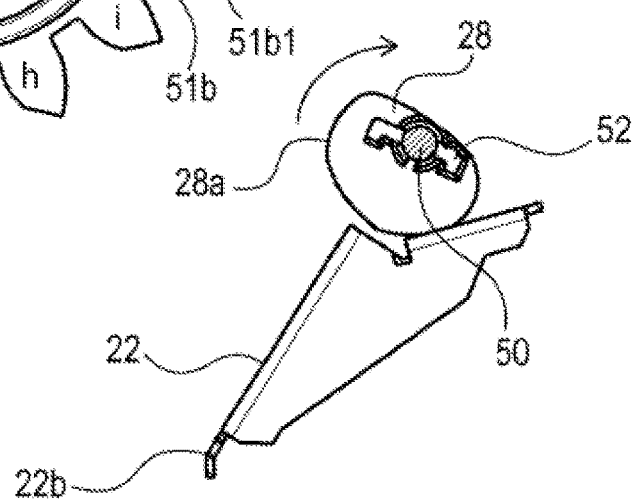

Part (a) of FIG. 13 is a side illustration showing an engaging state between the transmission gears during a change of a state between the heating unit and the pressing roller from the pressure released state to the pressed state, and part (b) of FIG. 13 is a side illustration showing a state of the cam member during the change of the state between the heating unit and the pressing roller from the pressure released state to the pressed state.

Figure 14:
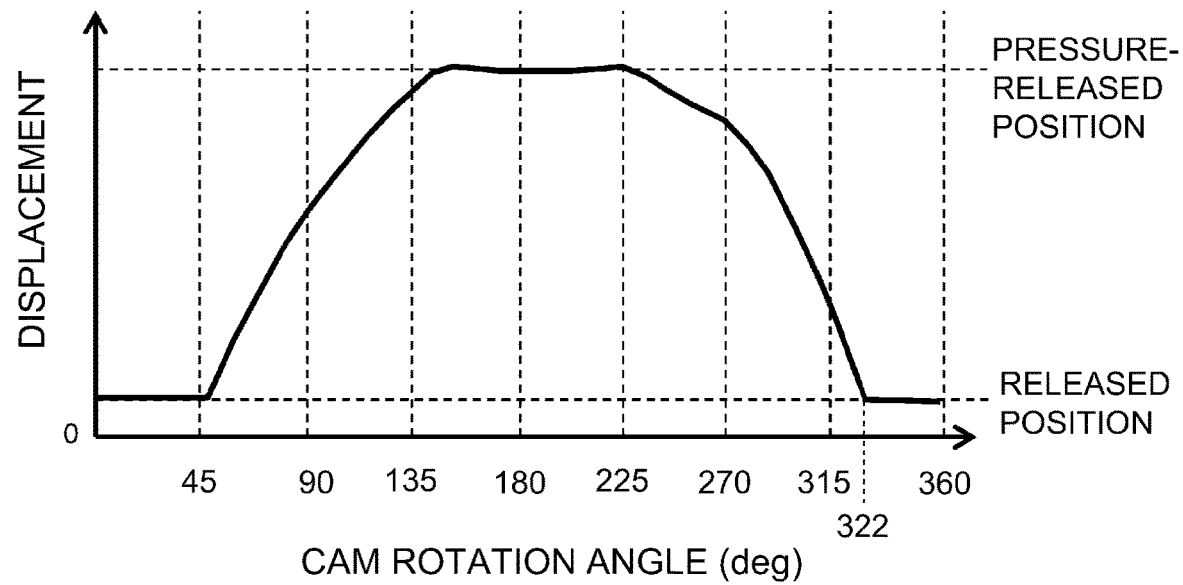
Figure 14:
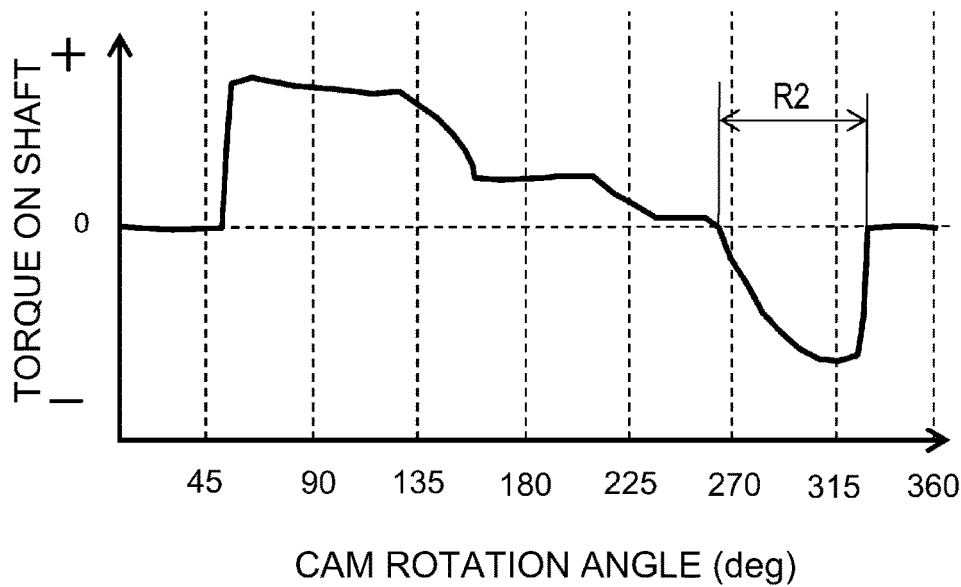

Part (a) of FIG. 14 is a graph showing a relationship between a rotation angle and displacement when the cam member rotates one full turn, and (b) of FIG. 14 is a graph showing a relationship between the rotation angle and a torque on a rotation shaft of the cam member when the cam member rotates one full turn.

Figure 15:
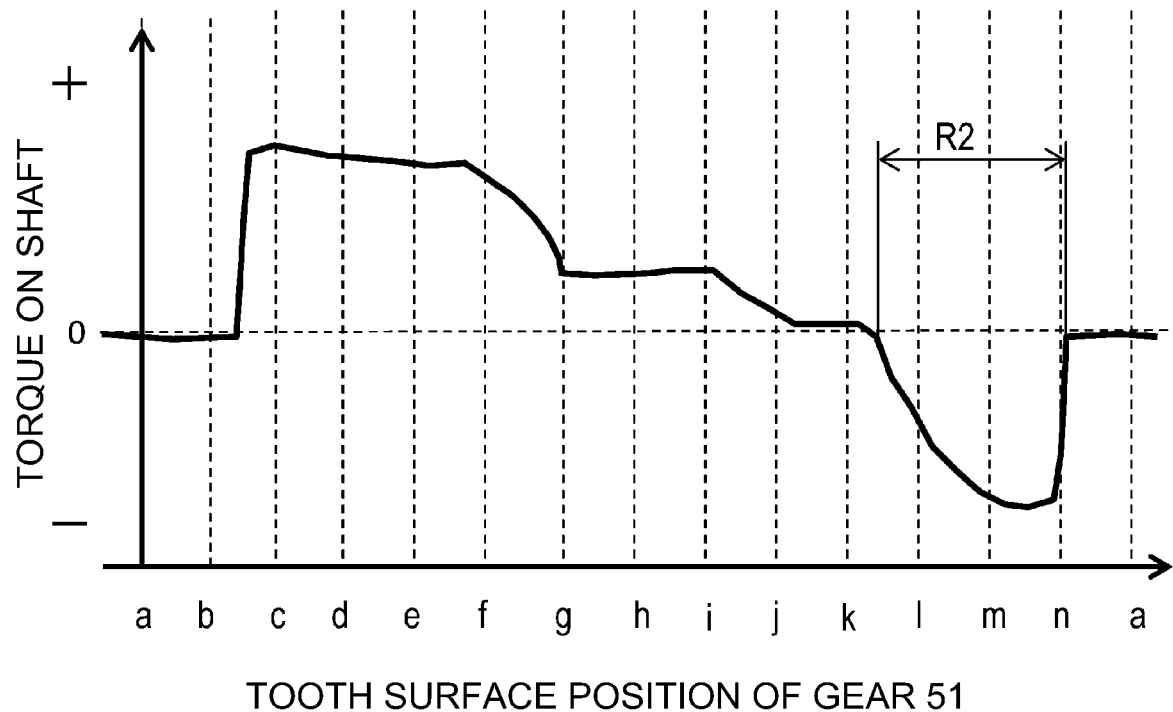

FIG. 15 is a graph showing a relationship between the torque on the rotation shaft of the cam member and a position of a tooth of a first gear.

Part (a) of FIG. 16 is a table showing a particular sheet of teeth a to j of a first gear 51 shown in part (a) of FIG. 10, and part (b) of FIG. 16 is a table showing a particular sheet of teeth k to n of the first gear 51 shown in part (a) of FIG. 10.

DESCRIPTION OF EMBODIMENTS

An embodiment of an image forming apparatus including a drive transmission device according to the present invention will be specifically described with reference to the drawings.

<Image Forming Apparatus>

Figure 1:
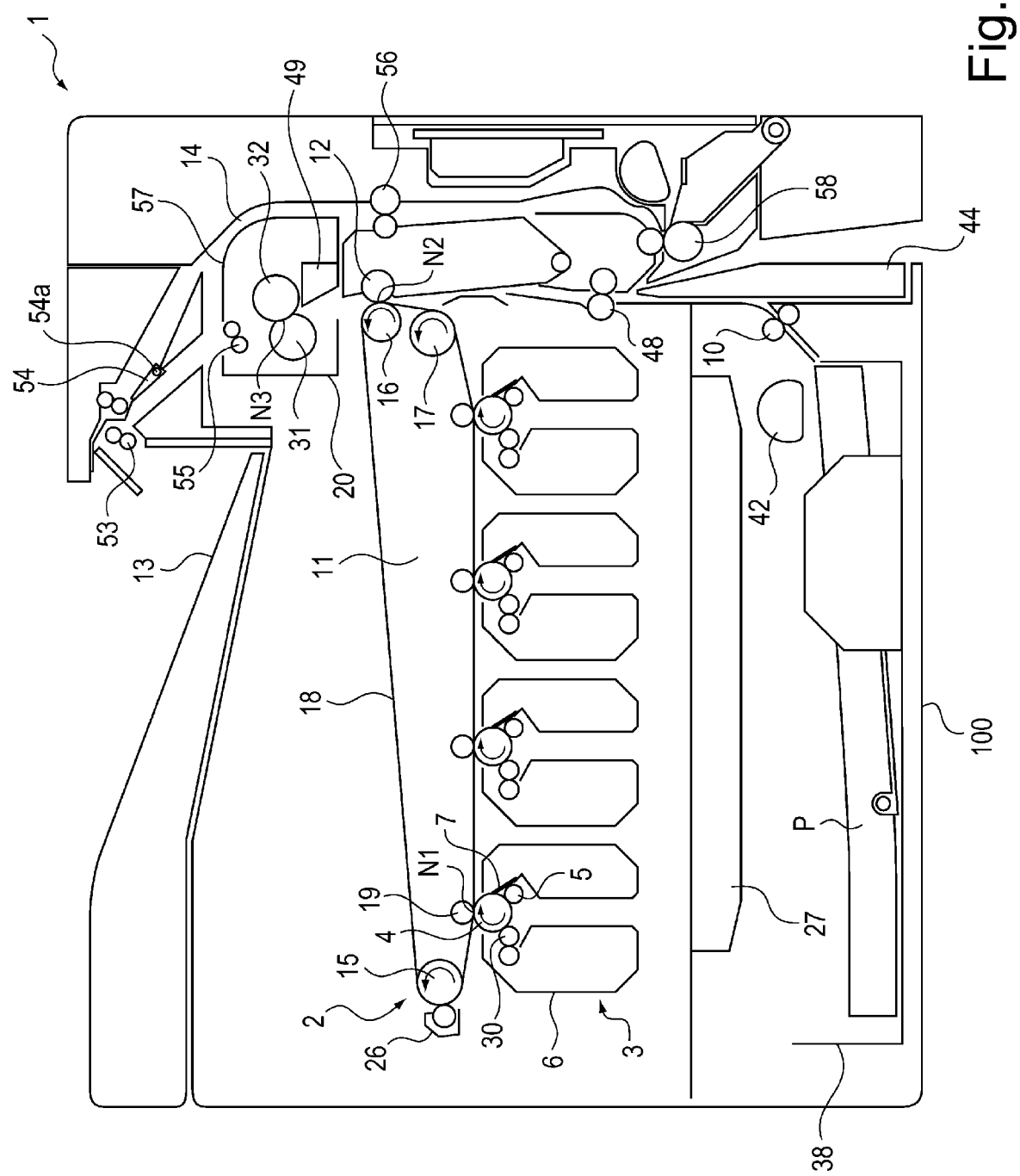
FIG. 1 is a sectional illustration showing a structure of an image forming apparatus.

First, a structure of the image forming apparatus including the drive transmission device according to the present invention will be described with reference to FIG. 1. FIG. 1 is a sectional illustration showing the structure of the image forming apparatus. An image forming apparatus 1 is an example of a color image forming apparatus of an electrophotographic type and four-drum type. At a central portion of the image forming apparatus 1 shown in FIG. 1, an image forming portion 2 as an image forming means for forming an image on a recording material P is provided. The image forming portion 2 includes process cartridges of four colors of yellow, magenta, cyan and black. Each of the process cartridges includes a photosensitive drum 4 as an image bearing member.

At a periphery of each photosensitive drum 4, a charging roller 5 as a charging means, a developing device 6 as a developing means, and a cleaning device 7 as a cleaning means are provided. Above the respective process cartridges 3, an intermediary transfer unit 11 is provided. The intermediary transfer unit 11 includes an intermediary transfer belt 18 stretched by stretching rollers 15, 16 and 17 so as to be rotatable in the counterclockwise direction of FIG. 1.

On an inner peripheral surface side of the intermediary transfer belt 18, primary transfer rollers 19 as primary transfer means are provided opposed to the photosensitive drums 4, respectively. A primary transfer nip N1 is formed between a surface of each photosensitive drum 4 and an associated primary transfer roller 19 via the intermediary transfer belt 18. A secondary transfer roller 12 as a secondary transfer means is provided opposed to the stretching roller 16 via the intermediary transfer belt 18. A secondary transfer nip N2 is formed between the stretching roller 16 and the secondary transfer roller 12 via the intermediary transfer belt 18. A cleaning device 26 as a cleaning means is provided opposed to the stretching roller 15 via the intermediary transfer belt 18.

<Image Forming Operation>

Each of the photosensitive drums 4 is rotationally driven in the clockwise direction of FIG. 1. A surface of the photosensitive drum 4 is electrically charged uniformly by the charging roller 5. The uniformly charged surface of the photosensitive drum 4 is irradiated with light, depending on image information, from an exposure device 27 as an image exposure means. As a result, an electrostatic latent image is formed on the surface of the photosensitive drum 4. The electrostatic latent image formed on the surface of the photosensitive drum 4 is supplied with toner (developer) of an associated color from a developing roller 30 as a developer carrying member provided in the developing device 6, and thus is developed into a toner image.

The respective color toner images formed on the surfaces of the respective photosensitive drums 4 are successively primary-transferred superposedly onto an outer peripheral surface of the intermediary transfer belt 18, rotating in the counterclockwise direction of FIG. 1, under application of a primary transfer bias to the primary transfer rollers 19. Residual toner remaining on the surface of each photosensitive drum 4 after the primary transfer is removed and collected by the cleaning device 7.

On the other hand, the recording material P accommodated in a feeding cassette 38 is fed by a feeding roller 42 and is separated and fed one by one by a separation roller 10. Thereafter, a leading end portion of the recording material P is guided by a feeding guide 44 and is abutted against a nip of a registration roller pair 48 which is at rest, so that oblique movement of the recording material P is rectified. Thereafter, the registration roller pair 48 is rotationally driven at a predetermined timing, so that the recording material P is nipped and fed by the registration roller pair 48 and then is introduced into the secondary transfer nip N2 formed by the outer peripheral surface of the intermediary transfer belt 18 and the secondary transfer roller 12.

At the secondary transfer nip N2, a secondary transfer bias is applied from an unshown secondary transfer bias voltage source to the secondary transfer roller 12, whereby the toner images superposed and carried on the outer peripheral surface of the intermediary transfer belt 18 are transferred onto the recording material P. Thereafter, the recording material P is fed to a fixing unit 20 as a fixing means. The fixing unit 20 includes a heating unit 31 and a pressing roller 32. The recording material P on which unfixed toner images are carried is heated and pressed during nip-feeding of the recording material P by the heating unit 31 and the pressing roller 32, so that the toner images carried on the recording material P are heat-fixed. Thereafter, the recording material P is nipped and fed by a feeding roller pair 55 and a discharging roller pair 53 and then is discharged onto a discharge portion 13.

In the case where printing is carried out on double surfaces of the recording material P, in a state a trailing end portion of the recording material P with respect to a movement direction is nipped by the discharging roller pair 53, a flapper 54 rotates about a rotation shaft 54a in the counterclockwise direction, and the discharging roller pair 53 is reversely rotated, so that the recording material P is guided to a feeding path 14 for double-side printing. Then, the recording material P is fed by feeding roller pairs 56 and 58, so that the recording material P is turned upside down and the leading end portion of the recording material P is abutted against the nip of the registration roller pair 48 which is at rest, so that oblique movement of the recording material P is rectified.

Thereafter, the registration roller pair 48 is rotationally driven at a predetermined timing, so that the toner images are transferred onto a second surface of the recording material P at the secondary transfer nip N2. Thereafter, the recording material P passes through the fixing unit 20 and thus the toner images are fixed, and then the flapper 54 rotates about the rotation shaft 54a in the clockwise direction, so that the recording material P is nipped and fed by the feeding roller pair 55 and the discharging roller pair 53 and then is discharged onto the discharge portion 13.

<Image Forming Apparatus Main Assembly>

Figure 9:
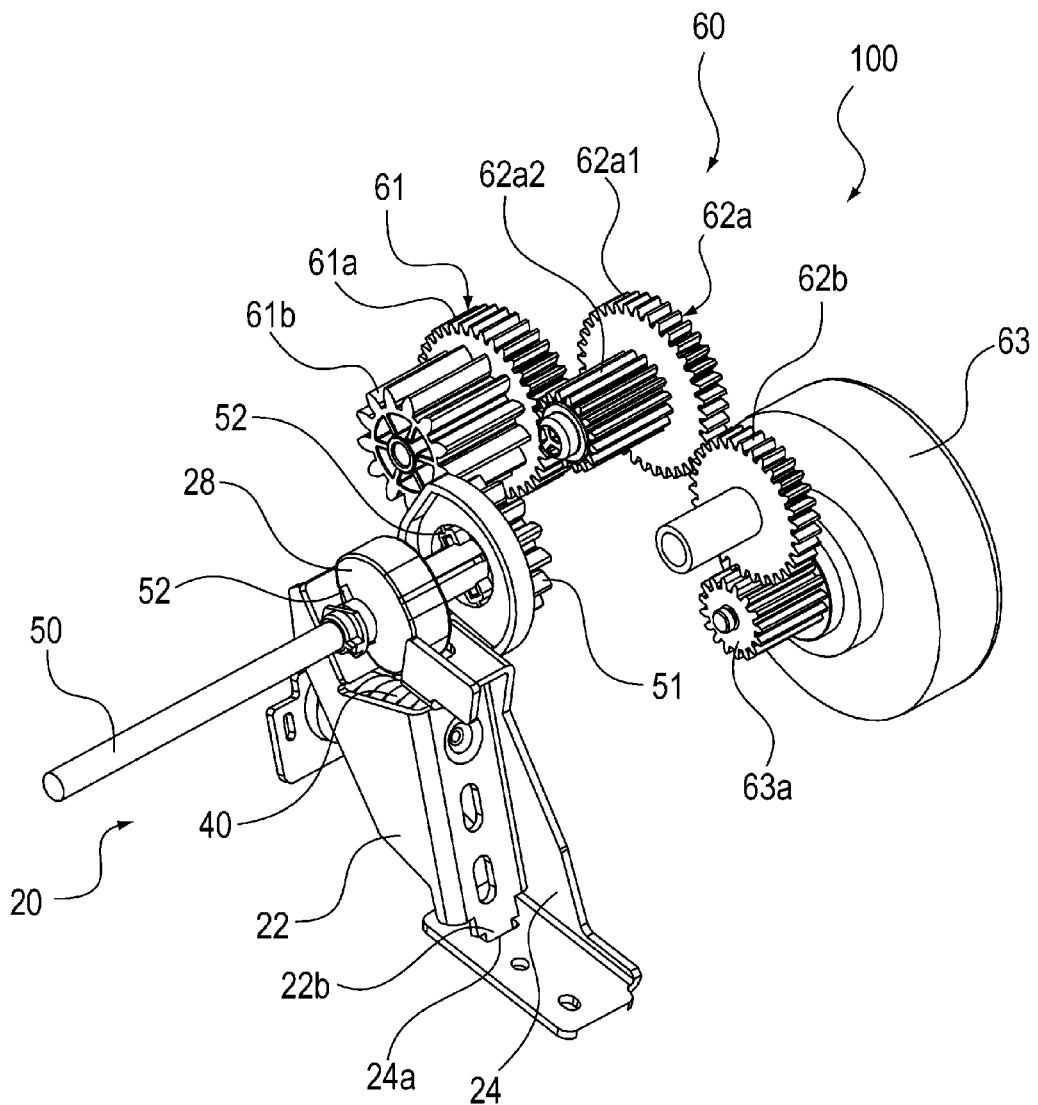
FIG. 9 is a perspective illustration showing a structure of a drive transmission device for transmitting a rotational driving force to a cam member.

As shown in FIG. 9, an apparatus main assembly (image forming apparatus main assembly) 100 of the image forming apparatus 1 includes a second gear 61 for transmitting drive (driving force) in engagement with a first gear 51 provided in the fixing unit 20. When the fixing unit 20 is mounted in the apparatus main assembly 100, the first gear 51 and a small diameter gear 61b of the second gear 61 engage with each other.

<Mounting and Demounting Unit>

Figure 6:
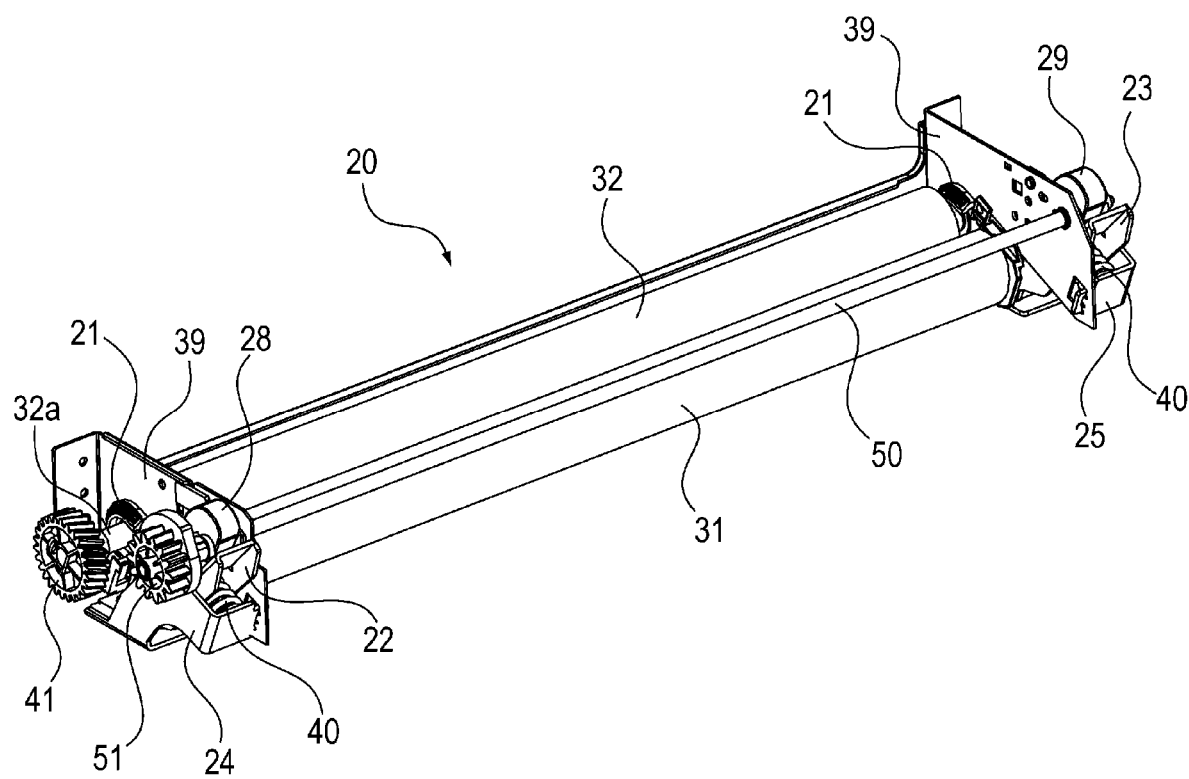
FIG. 6 is a perspective illustration showing a structure of a pressing member for applying pressure to the heating unit and the pressing roller which are provided in the fixing unit.

The fixing unit 20 as a mounting and demounting unit fixes the toner image on the recording material P. As shown in FIG. 6, the fixing unit 20 includes cam members 28 and 29 capable of changing a state of the heating unit 31 as a heating member and the pressing roller 32 as a pressing member, which are two members provided in the fixing unit 20, between a pressed state and a pressure-released state. The fixing unit 20 further includes pressing plates 22 and 23 constituting the pressing member is combination with the cam members 28 and 29 and includes pressing springs 40. These pressing springs 40 are constituted as an urging means for urging (pressing) the heating unit 31 as the heating member and the pressing roller 32 as the pressing member.

Further, the fixing unit 20 includes the first gear 51 connected with the cam members 28 and 29 via a rotation shaft 50. The first gear 51 is provided coaxially with the cam members 28 and 29. The cam members 28 and 29 rotates in interrelation with rotation of the first gear 51 via the rotation shaft 50 and controls an urging force by the pressing springs (urging means) 40 via the pressing plates 22 and 23 as pressing members. The pressing plates (pressing members) 22 and 23 press the cam members (cams) 28 and 29.

Figure 2:
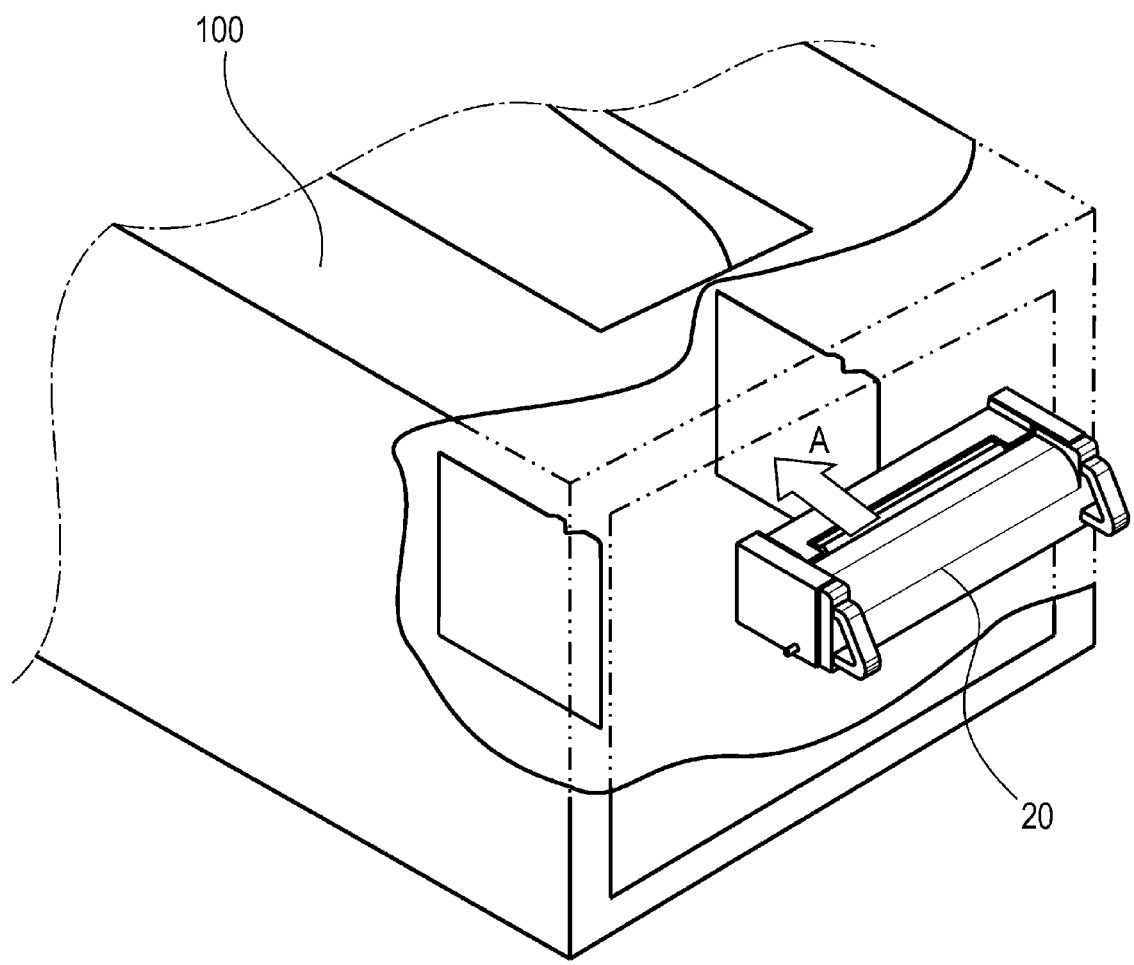
FIG. 2 is a perspective illustration showing a mounting and demounting direction of a fixing unit.
Figure 3:
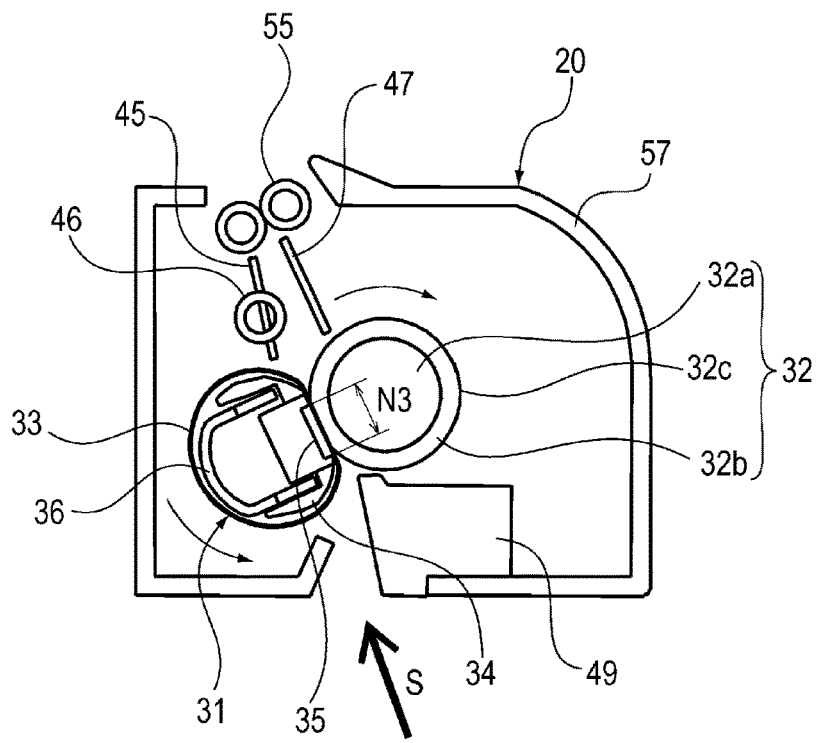
FIG. 3 is a sectional illustration showing a structure of a fixing unit.

The fixing unit 20 is constituted detachably mountable to the apparatus main assembly 100 with respect to an arrow A direction of FIG. 2. As shown in FIG. 3, the fixing unit 20 is constituted by including the heating unit 31, the pressing roller 32, the feeding roller pair 55, a feeding guide 49 and an outer casing 57.

<Heating Member>

As shown in FIG. 3, the heating unit 31 as the heating member includes a cylindrical flexible fixing film 33 as a rotatable heating member. The heating unit 31 further includes a guiding member 34 which has a substantially semicircular trough shape in cross-section and which has a heat-resistant property and rigidity. Further, the heating unit 31 includes a heater 35 as a heating source. The heater 35 is engaged and fixed in a groove provided along a longitudinal direction on the outer peripheral surface of the guiding member 34. The fixing film 33 is loosely fitted externally around an outer periphery of the guiding member 34 on which the heater 35 is mounted. Further, the heating unit 31 includes a pressing stay 36 having a U-shape in cross-section and rigidity. The pressing stay 36 is provided inside the guiding member 34.

Figure 4:
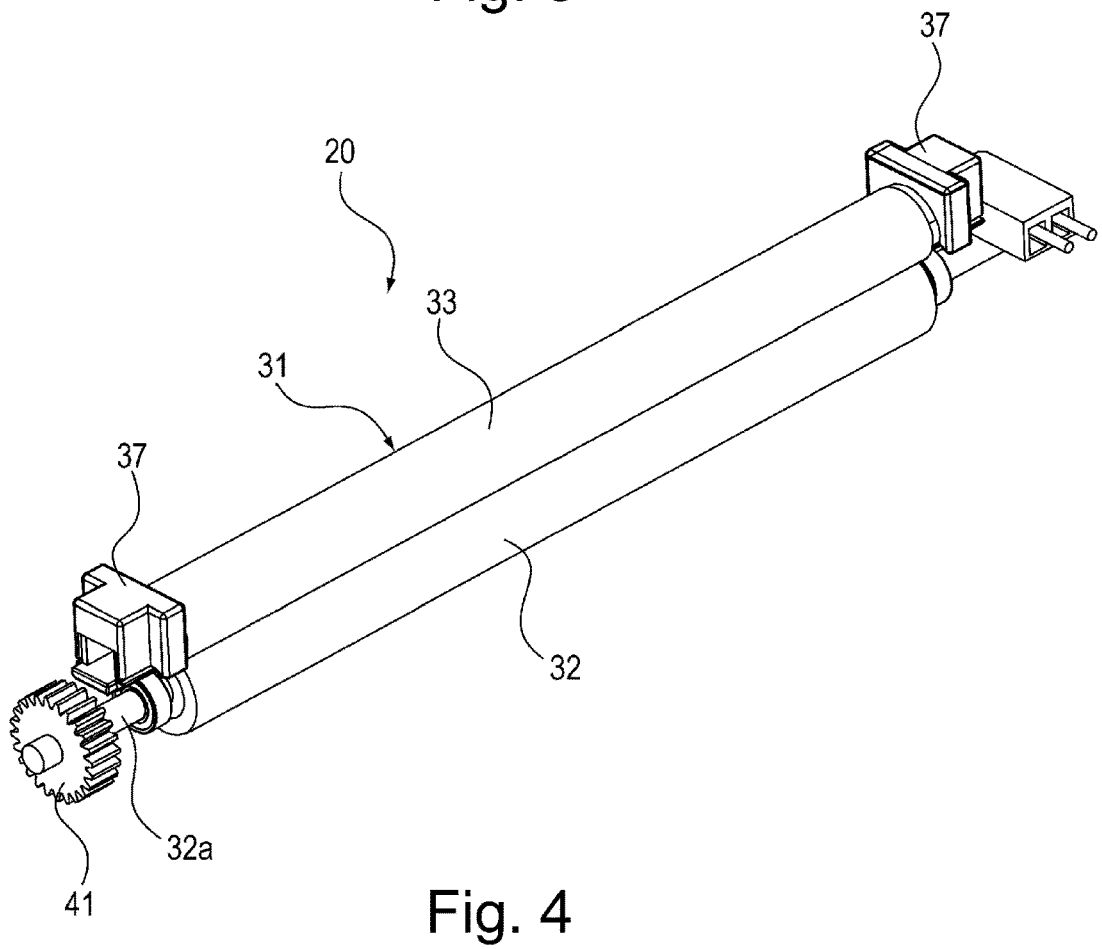
FIG. 4 is a perspective illustration showing a structure of a heating unit and a pressing roller which are provided in the fixing unit.
Figure 5:
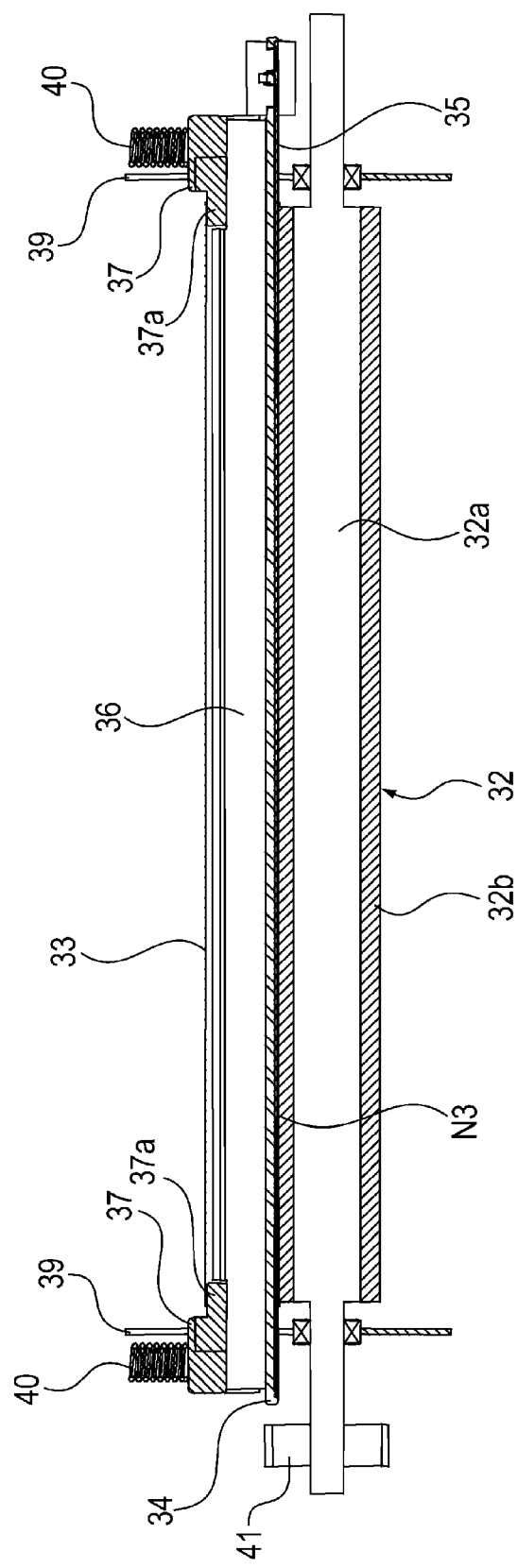
FIG. 5 is a sectional illustration showing the structure of the heating unit and the pressing roller which are provided in the fixing unit.

As shown in FIG. 4, regulating members 37 are provided opposed to longitudinal end portions of the fixing film 33. Each of the regulating members 37 regulates a longitudinal position of the fixing film 33 and regulates a traveling locus of an outer peripheral surface or an inner peripheral surface of the fixing film 33. In this embodiment, as shown in FIG. 5, by flanges 37a of the regulating members 37, not only movement of the fixing film 33 in the longitudinal direction is prevented but also the traveling locus of the fixing film 33 at longitudinal end portions is regulated. The fixing film 33 is a structure consisting of a composite layer in which a heat-resistant resin belt or a metal belt is used as a base layer, and on an outer peripheral surface of the base layer, an elastic layer, a parting layer and the like are formed. The fixing film 33 is formed with a flexible member which is thin as a whole and which has high thermal conductivity and low thermal capacitance.

The heater 35 is consisting of an elongated thin linear heating member which extends in the longitudinal direction perpendicular to a feeding direction of the recording material P and which has low thermal capacitance. The heater 35 is constituted by including a substrate of a ceramic material such as aluminum nitride or alumina and an energization heat generating layer of a silver-palladium alloy or the like formed on the surface of the substrate. The heater 35 consisting of a ceramic heater is well known and therefore will be omitted from detailed description.

<Second Pressing Member>

As shown in FIG. 3, the pressing roller 32 as a second pressing member is constituted by forming, on an outer peripheral surface of a rotation shaft 32a consisting of a core metal, an elastic layer 32b of a silicone rubber or the like. In order to improve non adhesiveness, on an outer peripheral surface of the elastic layer 32b, a layer of a fluorine containing resin material such as PTFE (polytetrafluoroethylene) may also be formed as a surface layer 32c. As another example, a layer of a fluorine containing resin material such as PFA (tetrafluoroethylene perfluoroalkylvinyl ether copolymer) may also be formed as the surface layer 32c.

As another example, a layer of a fluorine-containing resin material such as FEP (tetrafluoroethylene-hexafluoropropylene copolymer) may also be formed as the surface layer 32c. As shown in FIG. 4, at one longitudinal end portion of the rotation shaft 32a of the pressing roller 32, a driving gear 41 is provided. To the driving gear 41, a rotational driving force is transmitted from a driving source provided on the apparatus main assembly 100 side. As a result, the pressing roller 32 is rotated.

As shown in FIG. 5, on an inner peripheral surface side of the fixing film 33, the guiding member 34, the heater 35, the pressing stay 36 and the like are provided. The regulating member 37 is urged toward the pressing roller 32 by the pressing spring 40. As a result, the fixing film 33 is press contacted to the pressing roller 32 via the pressing stay 36, the guiding member 34 and the heater 35. As a result, a fixing nip N3 is formed between the outer peripheral surface of the fixing film 33 and the pressing roller 32. The fixing film 33 is rotated by rotation of the pressing roller 32.

As shown in FIG. 5, the regulating members 37 are supported by side plates 39. The recording material P passes through the fixing nip N3 in a state in which the recording material P overlaps with the fixing film 33 in intimate contact with the fixing film 33. The recording material P passes through the fixing nip N3 while being nipped and fed in the fixing nip N3 by the outer peripheral surface of the fixing film 33 and the pressing roller 32. In a process thereof, heat energy is imparted from the heater 35 to the unfixed toner image, carried on the recording material P, via the fixing film 33, so that the unfixed toner image is heated and melted and thus is heat-fixed on the recording material P.

Thereafter, the recording material P passes through the fixing nip N3 and is separated from the outer peripheral surface of the fixing film 33 by high stiffness of the recording material P and by the action of a separating member 45 shown in FIG. 3. Further, the recording material P is sent to the feeding roller pair 55 by being guided by the separating member 45, a feeding guide 47 provided above a recording material feeding path where the separating member 45 is provided, and a feeding roller 46 provided on the separating member 45. Thereafter, the recording material P is fed by the feeding roller pair 55 and the discharging roller pair 53 and thus is discharged onto the discharge portion 13.

<Pressing Member>

As shown in FIG. 6, both longitudinal end portions of the rotation shaft 32a of the pressing roller 32 are rotatably supported by bearing portions 21 mounted on the side plates 39 provided in the fixing unit 20. The heating unit 31 as the heating member is supported by the side plates 39 so as to be movable in a press-contact direction to the pressing roller 32. The regulating members 37 of the heating unit 31 shown in FIG. 4 are pressed via the pressing plates 22 and 23 by an urging force of the pressing springs 40 as a part of the pressing member shown in FIG. 6, whereby the fixing nip N3 is formed between the heating unit 31 and the pressing roller 32.

As shown in FIGS. 6 and 9, one end portion 22b of each of the pressing plates 22 and 23 is inserted into and engaged with a hole 24a provided in supporting frames 24 and 25 provided on the side plates 39. The one end portion of pressing plate 23 and corresponding hole in the supporting frame 25 are not shown in the figures, but, in this embodiment, it has the same configuration as one end portion 22b and hole 24a. The pressing springs 40 pressing the regulating members 37 shown in FIG. 4 are provided between the supporting frame 24 and the pressing plate 22 and between the supporting frame 25 and the pressing plate 23. A spacing (separating) means of the fixing nip N3 in this embodiment includes the cam members 28 and 29 for changing pressure applied to the fixing nip N3. The cam members 28 and 29 rotate integrally with the first gear 51 via the rotation shaft 50 shown in FIG. 6.

At longitudinal end portions of the rotation shaft 50, the cam members symmetrical in shape with each other are provided. By rotation of the cam members 28 and 29, cam surfaces of the cam members 28 and 29 act on the pressing plates 22 and 23, so that the pressure applied to the fixing nip N3 is changed. The cam members 28 and 29 acting on the pressing plates 22 and 23 are rotated by transmitting a rotational driving force from a motor 63 as a driving source of a drive transmission device 60 shown in FIG. 9 to the first gear 51 provided at one longitudinal end portion of the rotation shaft 50.

Figure 7:
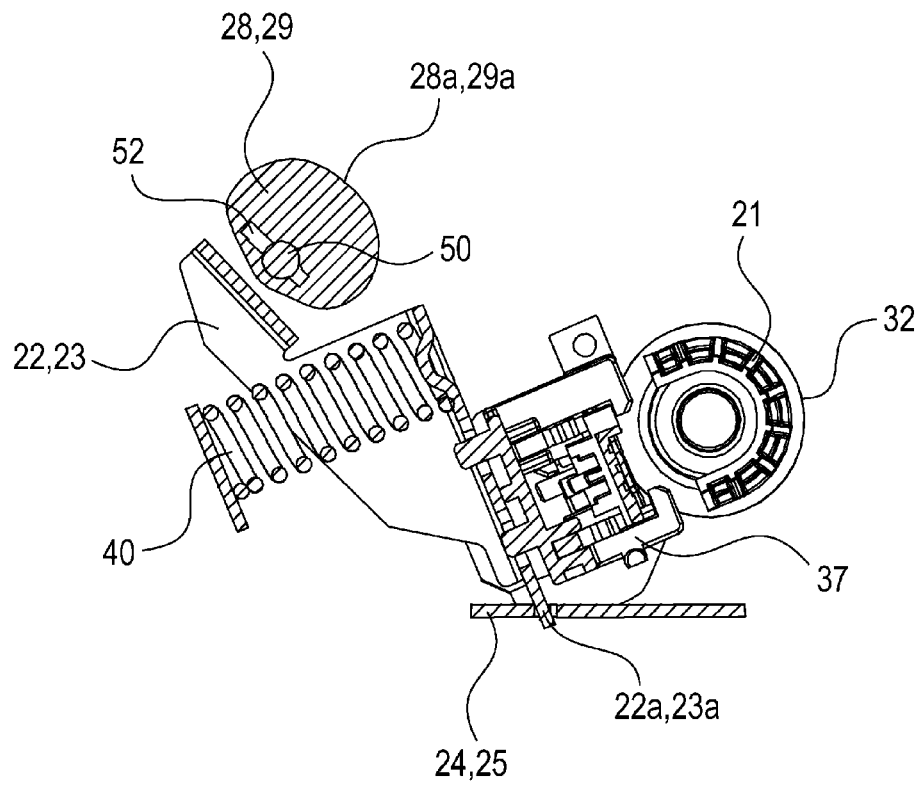
FIG. 7 is a sectional illustration of the fixing unit during a normal operation in which a fixing nip is formed by the heating unit and the pressing roller which are provided in the fixing unit.

As shown in FIG. 7, the cam members 28 and 29 includes the cam surfaces 28a and 29a for controlling positions of the pressing plates 22 and 23. At one longitudinal end portion of the rotation shaft 50 on which the cam members 28 and 29 are fixed, an unshown flag member for detecting and controlling a state of the fixing nip N3 is provided. By detecting whether the flag member rotating integrally with rotation of the rotation shaft 50 blocks an optical path of an unshown light transmission sensor or permits light transmission, a pressed state and a pressure released state of the fixing nip N3 are detected.

During image formation, as shown in FIG. 7, the cam members 28 and 29 are held in a state in which the cam members 28 and 29 do not contact the pressing plates 22 and 23. As a result, the heating unit 31 is contacted to the pressing roller 32 by urging the regulating members 37 by the pressing plates 22 and 23 with an urging force of the pressing springs 40, so that the fixing nip N3 is formed.

Figure 8:
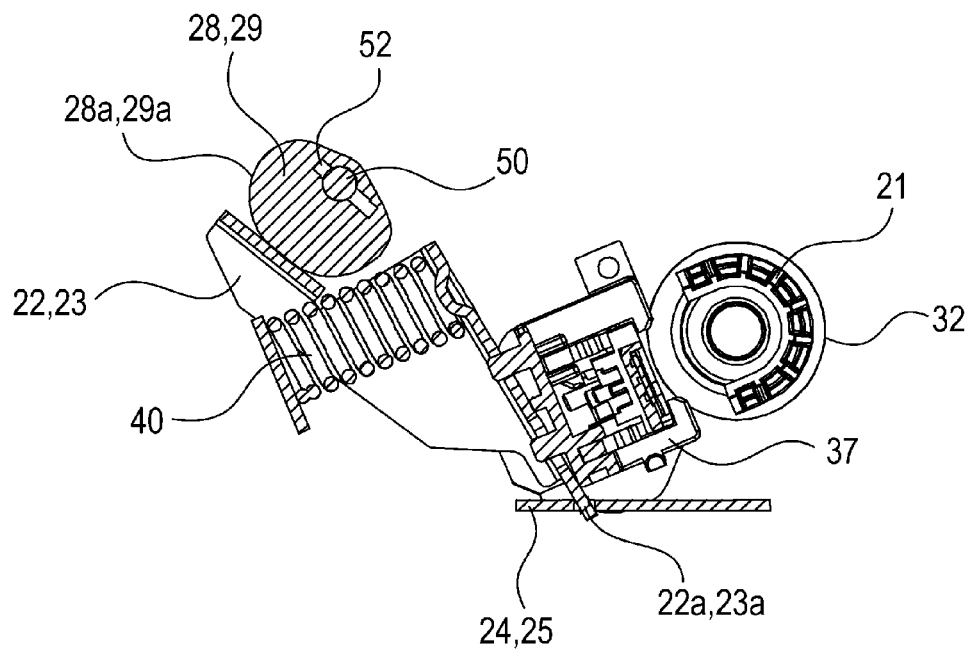
FIG. 8 is a sectional illustration showing a state in which the fixing nip between the heating unit and the pressing roller which are provided in the fixing unit is eliminated.

In the case where the fixing nip N3 is required to be eliminated due to jam clearance or the like, the rotational driving force is transmitted to the first gear 51 fixed at one longitudinal end portion of the rotation shaft shown in FIG. 6, so that the cam members 28 and 29 rotate integrally with the rotation shaft. Then, as shown in FIG. 8, the cam surfaces 28a and 29a of the cam members 28 and 29 contact and slide on the pressing plates 22 and 23. As a result, the pressing plates 22 and 23 rotate in the counterclockwise direction of FIG. 8 about rotation centers 22a and 23a, engaged with the supporting frames 24 and 25, against the urging force of the pressing springs 40.

As a result, the heating unit 31 is spaced from the pressing roller 32, so that the fixing nip N3 is eliminated. In a state in which the fixing nip N3 is eliminated, permanent deformation of the elastic layer 32b of the pressing roller 32 can be suppressed. Further, the recording material P jammed in the fixing unit 20 can be easily removed.

In this embodiment, the rotational driving force is transmitted from the motor 63 shown in FIG. 9 to the first gear 51 by the drive transmission device 60 when a power source of the image forming apparatus 1 is turned off and when a jam of the recording material P occurs. The motor 63 is driven and controlled by an unshown CPU (central processing unit) as a control means. As a result, the cam members 28 and 29 are rotated integrally with the rotation shaft 50, so that elimination of the fixing nip N3 is carried out.

The elimination of the fixing nip N3 may also be performed by alleviating the pressure of the pressing springs 40 without completely eliminating the pressure. This can be easily carried out by appropriately setting a shape of the cam surfaces 28a and 29b consisting of outer peripheral surfaces of the cam members 28 and 29. By appropriately setting the shape of the cam surfaces 28a and 29a, it is possible to prepare various patterns different in pressure.

Further, when the cam members 28 and 29 rotate, as shown in FIG. 7, the cam surfaces 28a and 29a of the cam members 28 and 29 are spaced from the pressing plates 22 and 23. Then, by the urging force of the pressing springs 40, the pressing plates 22 and 23 are rotated in the clockwise direction of FIG. 7 about the rotation centers 22a and 23a engaged with the supporting frames 24 and 25. As a result, the pressing plates 22 and 23 urge the regulating members 37, so that the heating unit 31 is contacted to the pressing roller 32 and thus the fixing nip N3 is in the pressed state.

<Drive Transmission Device>

FIG. 9 is a perspective illustration showing a structure of the drive transmission device 60 for transmitting the rotational driving force to the cam members 28 and 29. The drive transmission device 60 transmits drive (driving force) between the apparatus main assembly 100 and the fixing unit 20 as a mounting and demounting unit provided detachably mountable to the apparatus main assembly 100. The drive transmission device 60 shown in FIG. 9 includes the second gear 61 as a driving gear and the first gear 51 as a driven (follower) gear engaging with the second gear 61. The second gear 61 is provided on the apparatus main assembly 100 side and is rotated by transmitting thereto the rotational driving force from the motor 63 as a driving source. The first gear 51 is provided on the fixing unit 20 side as shown in FIG. 6 and is rotated in engagement with the small diameter gear 61b of the second gear 61 as shown in FIG. 9.

On the apparatus main assembly 100 side, the second gear 61 as a driving gear, the motor 63 and transmission gears 62a and 62b are provided. The transmission gear 62b is engaged with a driving gear 63a of the motor 63, and a large diameter gear 62a1 of the transmission gear 62a consisting of a two stage gear is engaged with the transmission gear 62b. Further, a large diameter gear 61a of the second gear 61 consisting of a two stage gear is engaged with a small diameter gear 62a2 of the transmission gear 62a. As a result, by rotational drive of the motor 63, the second gear 61 is rotated via the driving gear 63a, the transmission gear 62b and the transmission gear 62a.

As shown in FIG. 9, on the fixing unit 20 side, the first gear 51 as the driven gear, the rotation shaft 50, the cam member 28, the pressing spring 40, the pressing plate 22 and the supporting frame 24 are provided. Rotation of each of the first gear 51 and the cam member 28 is prevented through parallel pins 52 provided on the rotation shaft 50. The first gear 51 is provided at an engaging position with the small diameter gear 61b of the second gear 61 provided on the apparatus main assembly 100 side in a state in which the fixing unit 20 is mounted at an image forming position of the apparatus main assembly 100. By the rotational driving force transmitted to the first gear 51 from the second gear 61 rotated by rotational drive of the motor 63, the cam member 28 is rotated via the rotation shaft.

Next, with reference to FIGS. 10 to 14, an engaging state between the small diameter gear 61b of the second gear 61 and the first gear 51 when the cam member 28 is rotated one full turn by drive transmission from the second gear 61 as the driving gear to the first gear 51 as the driven gear will be described. Part (a) of FIG. 10 is a side illustration showing the engaging state between the small diameter gear 61b of the second gear 61 and the first gear 51 in a pressed state between the heating unit 31 and the pressing roller 32. Part (b) of FIG. 10 is a side illustration showing a state of the cam member 28 in the pressed state between the heating unit 31 and the pressing roller 32. Phases of the first gear 51 and the cam member 28 shown in (a) and (b) of FIG. 10 are 0°.

Part (a) of FIG. 11 is a side illustration showing an engaging state between the small diameter gear 61b of the second gear 61 and the first gear 51 during a change of a state between the heating unit 31 and the pressing roller 32 from the pressed state shown in parts (a) and (b) of FIG. 10 to the pressure-released state shown in parts (a) and (b) of FIG. 12. Part (b) of FIG. 11 is a side illustration showing a state of the cam member 28 during the change of the state between the heating unit 31 and the pressing roller 32 from the pressed state shown in parts (a) and (b) of FIG. 10 to the pressure-released state shown in parts (a) and (b) of FIG. 12. Phases of the first gear 51 and the cam member 28 shown in parts (a) and (b) of FIG. 11 are in a state in which the first gear 51 and the cam member 28 are integrally rotated in the clockwise direction from a state of 0° shown in parts (a) and (b) of FIG. 10 to a state of 50° shown in parts (a) and (b) of FIG. 11.

Part (a) of FIG. 12 is a side illustration showing an engaging state between the small diameter gear 61b of the second gear 61 and the first gear 51 in the pressure-released state between the heating unit 31 and the pressing roller 32. Part (b) of FIG. 12 is a side illustration showing a state of the cam member 28 in the pressure-released state between the heating unit 31 and the pressing roller 32. Phases of the first gear 51 and the cam member 28 shown in parts (a) and (b) of FIG. 12 are in a state in which the first gear 51 and the cam member 28 are integrally rotated in the clockwise direction from a state of 0° shown in parts (a) and (b) of FIG. 10 to a state of 180° shown in parts (a) and (b) of FIG. 12.

Part (a) of FIG. 13 is a side illustration showing an engaging state between the small diameter gear 61b of the second gear 61 and the first gear 51 during a change of a state between the heating unit 31 and the pressing roller 32 from the pressure-released state shown in parts (a) and (b) of FIG. 12 to the pressed state shown in parts (a) and (b) of FIG. 10. Part (b) of FIG. 13 is a side illustration showing a state of the cam member 28 during the change of the state between the heating unit 31 and the pressing roller 32 from the pressure-released state shown in parts (a) and (b) of FIG. 12 to the pressed state shown in parts (a) and (b) of FIG. 10. Phases of the first gear 51 and the cam member 28 shown in parts (a) and (b) of FIG. 13 are in a state in which the first gear 51 and the cam member 28 are integrally rotated in the clockwise direction from a state of 0° shown in parts (a) and (b) of FIG. 10 to a state of 250° shown in parts (a) and (b) of FIG. 13.

The small diameter gear 61b of the second gear 61 provided on the apparatus main assembly 100 side includes 13 teeth and has a normal involute shape which is a tooth surface shape of a normal gear. On the other hand, the first gear 51 provided on the fixing unit 20 side includes 14 teeth (teeth a to n shown in parts (a) of FIGS. 10 to 13).

As shown in parts (a) and (b) of FIG. 13, by the cam members (cams) 28 and 29 rotating integrally with the first gear 51 via the rotation shaft 50, two members (the heating unit 31 and the pressing roller 32) is changed in state from the pressure-released state to the pressed state. At that time, an urging force of the pressing springs 40 acts on the cam surfaces 28a and 29a of the cam members 28 and 29, so that the first gear 51 rotates in advance in the clockwise direction of part (a) of FIG. 13. A region where the first gear 51 rotates in advance and engages with the small diameter gear 61b (second gear) of the second gear 61 is defined as a preceding rotational region R1 shown in part (a) of FIG. 13.

Tooth surfaces 51d and 51e of four teeth k to n, of the first gear 51, corresponding to the preceding rotational region R1 have such an involute shape that the tooth surfaces 51d and 51e are subjected to positive addendum modification (increase in tooth thickness by increase in addendum circle diameter) of 0.5 mm toward an outside of the first gear 51 with respect to a radial direction. A root circle 51f of the four teeth k to n corresponding to the preceding rotational region R1 in which the tooth surfaces 51d and Me are subjected to positive addendum modification of 0.5 mm toward the outside of the first gear 51 with respect to the radial direction is taken into consideration. The root circle 51f of the four teeth k to n has such a shape that the four teeth k to n are cut toward an inside of the first gear 51 with respect to the radial direction correspondingly to 0.5 mm in which the tooth surfaces 51d and 51e are subjected to positive addendum modification of 0.5 mm. As a result, the first gear 51 is formed so that diameters of root circles 51c and 51f of 14 teeth a to j and k to n coincide with each other.

A shape of 10 teeth a to j corresponding to a region other than the preceding rotational region R1 of the first gear 51 shown in part (a) of FIG. 13 is set as follows. A tooth surface 51a on a side (left side of the tooth surface) where drive is transmitted from the small diameter gear 61b of the second gear 61 rotating in the counterclockwise direction of part (a) of FIG. 11 has a normal involute shape which is a tooth surface shape of a normal gear. On the other hand, also a tooth surface 51b on an opposite side (right side of the tooth surface) has the normal involute shape which is the tooth surface shape of the normal gear, but a tooth top 51b1 is cut.

The teeth (first teeth) k to n of the first gear 51 have the normal involute shape such that the tooth top is not cut, but the root circle is cut in an amount corresponding to 0.5 mm. As a result, generation of abutment of a tooth bottom of the small diameter gear 61b when the small diameter gear 61b of the second gear 61 engages with the teeth (first teeth) k to n of the first gear 51 is prevented. The teeth (second teeth) a to j of the first gear 51 are cut obliquely but at intermediary transfers thereof, so that free ends thereof are sharp (pointed).

As regards the first gear 51 in this embodiment, an amount of positive addendum modification of the plurality of teeth (second teeth) a to j shown in part (a) of FIG. 16 is 0.27 mm, and an amount of positive addendum modification of the plurality of teeth (first teeth) k to n shown in part (b) of FIG. 16 is 0.77 mm. For this reason, the amount of positive addendum modification of the plurality of teeth (first teeth) k to n shown in part (b) of FIG. 16 is set so as to be larger than the amount of positive addendum modification of the plurality of teeth (second teeth) a to j shown in part (a) of FIG. 16. As another example, in the case where the plurality of teeth (second teeth) a to j of the first gear 51 are normal teeth with the amount of positive addendum modification of 0 mm (i.e., are not subjected to the positive addendum modification), the plurality of teeth (first teeth) k to n of the first gear 51 can be constituted by teeth subjected to the positive addendum modification by a predetermined amount of positive addendum modification.

Part (a) of FIG. 14 is a graph showing a relationship between a rotation angle and displacement when the cam member 28 rotates one full turn. Part (b) of FIG. 14 is a graph showing a relationship between the rotation angle and a torque on the rotation shaft 50 of the cam member 28. As shown in part (a) of FIG. 14, when the cam member 28 rotates to a position of 45° from a position of the pressed state (0°), between the heating unit 31 and the pressing roller 32, shown in parts (a) and (b) of FIG. 10, the cam surface 28a of the cam member 28 abuts against and slides on the pressing plate 22, so that displacement increases.

Thereafter, as shown in parts (a) and (b) of FIG. 11, the cam member 28 rotates to a position of 50°, and then as shown in parts (a) and (b) of FIG. 11, the cam member 28 rotates to a position of 180° where the heating unit 31 and the pressing roller 32 are in the pressure-released state.

Thereafter, as shown in parts (a) and (b) of FIG. 13, the cam member 28 rotates to a position of 250°. At this time, as shown in part (a) of FIG. 14, the displacement lowers. Then, an urging force of the pressing spring 40 acts on the cam surface 28a of the cam member 28 via the pressing plate 22, and thus tries to rotate the first gear 51 earlier than drive transmission from the small diameter gear 61b of the second gear 61. As a result, as shown in part (b) of FIG. 14, a preceding rotational region R2 in which the torque on the rotation shaft 50 is negative appears. Thereafter, the cam member 28 rotates to a position of 360°, and thus returns to the position of the pressed state shown in parts (a) and (b) of FIG. 10.

Here, before the cam members 28 and 29 rotate in advance, there is a need that the teeth (first teeth) k to n of the first gear 51 in the preceding rotational region R1 reliably engage with associated teeth of the small diameter gear 61b of the second gear 61. For this reason, the preceding rotational region R1 of the teeth (first teeth) k to n of the first gear shown in FIG. 13 is set so as to be larger than the preceding rotational region R2 of the cam members 28 and 29 shown in part (b) of FIG. 14 (R1>R2).

Further, a region (portion of the tooth n of the first gear 51) in which the preceding rotation of the cam members 28 and 29 ends is considered. A region in which the pressing plates 22 and 23 and the cam members 28 and 29 are in non-contact with each other and before the cam members 28 and 29 are rotated again by the motor 63 via the drive transmission device 60 is considered. At this time, setting is made so that engagement of the teeth (first teeth) k to n of the first gear 51 in the preceding rotational region R1 with the teeth of the small diameter gear 61b of the second gear 61 ends before the torque on the rotation shaft 50 shifts to a positive side.

The graph of the cam members 28 and 29 shown in part (a) of FIG. 14 is considered. A region from an angle (225°) where an outer diameter of the cam members 28 and 29 starts to lower from a maximum outer diameter (pressure released position) to an angle (322°) where the outer diameter of the cam members 28 and 29 becomes a minimum outer diameter is considered. The rotation angle at this time is set at a rotation angle where the teeth k to n of the first gear 51 are provided.

That is, in this embodiment, the rotation angle of the preceding rotational region R1 of the teeth (first teeth) k to n of the first gear 51 until the first gear 51 rotates in advance and then engages with the small diameter gear (second gear) 61b of the second gear 61 is 97° (=322°−225°). Depending on the shape of the cam members 28 and 29, the rotation angle can also be set at less than 97° or more than 97°. When noise reduction or the like is taken into consideration, the preceding rotational region R1 may preferably be set from 80° to 100°.

FIG. 15 is a graph showing a relationship between the torque on the rotation shaft 50 of the cam member 28 and positions of the teeth a to n of the first gear 51. As shown in parts (a) of FIGS. 10 to 13, the cam member 28 and the first gear 51 are fixed on the rotation shaft 50 by parallel pins 52. As a result, a positional relationship of the torque on the rotation shaft 50 with the teeth a to n of the first gear 51 is shape controlled as shown in FIG. 15. The tooth surfaces 51a on a side where the teeth a to j where the tooth tops 51b1 of the first gear 51 are cut are provided correspondingly to a range of the torque on the rotation shaft 50 from 0 (zero) to positive (+). The tooth surfaces, Md and Me of the teeth k to n of the first gear 51 subjected to the positive addendum modification are provided correspondingly to the preceding rotational region R1 which is a range in which the torque on the rotation shaft 50 is negative ( ).

Next, with reference to FIGS. 11 and 13, forces generated in the first gear 51 and the small diameter gear 61b of the second gear 61 at each of a position when the cam member 28 rotates 50° from the pressed state (0°) shown in part (b) of FIG. 10 and a position when the cam member 28 rotates 250° from the pressed state (0°) will be described. As shown in parts (a) and (b) of FIG. 11, a position (50°) during a change from the pressed state (0°) shown in parts (a) and (b) of FIG. 10 to the pressure-released state (180°) shown in parts (a) and (b) of FIG. 12 will be considered. At this time, the first gear 51 is rotationally driven in the clockwise direction of part (a) of FIG. 11 by the small diameter gear 61b of the second gear 61 rotationally driven in the counterclockwise direction of part (a) of FIG. 11 by the motor 63 as a driving source.

At this time, drive (driving force) in an arrow B direction of part (a) of FIG. 11 is transmitted to the tooth surface Ma of the tooth d of the first gear 51 from a tooth surface 61b1 of the small diameter gear 61b of the second gear 61 rotating in the counterclockwise direction of part (a) of FIG. 11. Then, in the fixing unit 20, a force generates in a direction (engaging direction between the gears) in which the fixing unit 20 is drawn into the apparatus main assembly 100. As a result, engagement between the first gear 51 and the small diameter gear 61b of the second gear 61 is ensured.

On the other hand, by the cam member 28, the two members (the heating unit 31 and the pressing roller 32) are changed in state from the pressure-released state (180°) shown in parts (a) and (b) of FIG. 12 to the pressed state (360°) shown in parts (a) and (b) of FIG. 10. At a position (250°) during the change in state, as shown in parts (a) and (b) of FIG. 13, an urging force of the pressing spring 40 acts on the cam surface 28a of the cam member 28 via the pressing plate 22. By this action, the first gear 51 is rotated in the clockwise direction of part (a) of FIG. 13 earlier than the drive transmission from the small diameter gear 61b of the second gear 61. As a result, preceding rotation of the cam member 28 and the first gear 51 generates. As a result, the driving side is momentarily changed to the first gear 51 side.

Thus, the precedently rotating tooth surface Me of the tooth 1, subjected to the positive addendum modification, of the first gear 51 shown in part (a) of FIG. 13 receives a reaction force in an arrow D direction from a tooth surface 61b2 of the small diameter gear 61b of the second gear 61. At that time, by the reaction force, on the fixing unit 20, a force of moving the fixing unit 20 away from the apparatus main assembly 100 acts.

When the tooth surface 51e of the first gear 51 rotates in advance and abuts against the tooth surface 61b2 of the small diameter gear 61b of the second gear (input gear) 61, noise generates. By the reaction force received by the tooth surface 51e during the preceding rotation, the fixing unit 20 is liable to move away from the apparatus main assembly 100. For this reason, backlash between the first gear 51 and the second gear (input gear) 61 is enlarged, so that impact noise increases.

However, in this embodiment, the tooth surfaces 51d and Me of the teeth k to n of the first gear 51 in the preceding rotational region R1 is subjected to the positive addendum modification in an amount corresponding to backlash (0.5 mm in this embodiment) in which movement of the fixing unit 20 is received by the apparatus main assembly 100. For this reason, a width (tooth thickness) of the tooth surface Md increases. That is, the tooth thicknesses of the teeth (first teeth) k to n, subjected to the device addendum modification, of the first gear 51 in the preceding rotational region R1 are thicker than the tooth thicknesses of the teeth (second teeth) a to j, subjected to cutting of the tooth top 51b1, of the first gear 51.

The preceding rotational region R1 shown in part (a) of FIG. 13 is a region where the first gear 51 engages with the small diameter gear (second gear) 61b of the second gear 61 when the heating unit 31 and the pressing roller 32 (which are the two members) are changed in state from the pressure-released state to the pressed state by the cam members (cams) 29 and 29. At positions corresponding to the preceding rotational region R1, the plurality of teeth (first teeth) k to n, subjected to the positive addendum modification, of the first gear 51 are disposed. At positions corresponding to a region other than the preceding rotational region R1, the plurality of teeth (second teeth) a to j, subjected to cutting of the tooth top 51b1, of the first gear 51.

As a result, play between the tooth surface 51d (51e) of the teeth k to n subjected to the positive addendum modification and a tooth surface 61b1 (61b2) of the small diameter gear 61b of the second gear 61 decreases. That is, backlash between each of the teeth (first teeth) k to n, subjected to the positive addendum modification, of the first gear 51 in the preceding rotational region R1, and associated one of the teeth of the small diameter gear (second gear) 61b of the second gear 61 will be considered. The backlash is smaller than backlash between each of the teeth (second teeth) a to j, subjected to cutting of the tooth top 51b1, of the first gear 51, and associated one of the teeth of the small diameter gear (second gear) 61b of the second gear 61.

As a result, even when the tooth surface 51e of the tooth 1, subjected to the positive addendum modification, of the first gear 51 receives the reaction force from the tooth surface 61b2 of the small diameter gear 61b of the second gear 61, movement of the fixing unit 20 can be received by the apparatus main assembly 100. As a result, engagement between the first gear 51 and the small diameter gear 61b of the second gear 61 is ensured.

A position of the tooth surface 51d of the tooth k, subjected to the positive addendum modification, of the first gear 51 shown in part (a) of FIG. 13 is provided in a region where a torque on the rotation shaft 50 is substantially 0 (zero), not a negative (−) value, as shown in FIG. 15. For this reason, the tooth k, subjected to the positive addendum modification, of the first gear 51 and the small diameter gear 61b of the second gear 61 are engaged with each other before these portions enter the preceding rotational region R1 in which the preceding rotation of the cam member 28 starts. As a result, play formed between the tooth surface 51e of the tooth 1 and the tooth surface 61b2 of the small diameter gear 61b of the second gear 61 is small when the cam member 28 and the first gear 51 rotate in advance in the clockwise direction of parts (a) and (b) of FIG. 13. For this reason, impact noise when the tooth surface 51e and the tooth surface 61b2 collide with each other can be reduced.

Next, a positional relationship between the first gear 51 and the small diameter gear 61b of the second gear 61 when the fixing unit 20 is mounted in the apparatus main assembly 100 will be described. In a state of the fixing unit 20 alone, the urging force of the pressing spring 40 acts on the cam surface 28a of the cam member 28 via the pressing plate 22, and rotates the cam member 28 and the first gear 51 to the position of the pressed state (0°) shown in parts (a) and (b) of FIG. 10.

For this reason, the preceding rotational region R1, of the first gear 51, in which the cam member 28 and the first gear 51 rotate in advance is prevented from being maintained at a position corresponding to the small diameter gear 61b as shown in parts (a) and (b) of FIG. 13. When the fixing unit 20 is mounted in an image forming position of the apparatus main assembly 100, as shown in part (a) of FIG. 10, the teeth a to j, subjected to the cutting of the tooth top 51b1 of the first gear 51 are in positions where the teeth engage with the small diameter gear 61b. For this reason, the tooth surfaces Md and Me of the teeth k to n, which are not subjected to the cutting of the tooth surface but is subjected to the positive addendum modification, of the first gear 51 in the preceding rotational region R1 are prevented from contacting the tooth surfaces 61b1 and 61b2 of the small diameter gear 61b of the second gear 61 as shown in part (a) of FIG. 13.

the fixing unit 20 is mounted in the image forming position of the apparatus main assembly 100, the tooth surfaces 51a and 51b of the teeth a to j, subjected to the cutting of the tooth top 51b1, of the first gear 51 always contact the tooth surfaces 61b1 and 61b2 of the small diameter gear 61b of the second gear 61. As a result, when the fixing unit 20 is mounted in the image forming position of the apparatus main assembly 100, there is no obstruction of mounting of the fixing unit 20 in a predetermined position of the apparatus main assembly 100 by abutment between the tooth tops 51b1 of the first gear 51 and the small diameter gear 61b of the second gear 61.

In this embodiment, there is a need to prevent mutual abutment of the tooth tops 51b1 of the gears engaging with each other when the fixing unit 20 is mounted and demounted. For this reason, the first gear 51 is prevented from engaging with the small diameter gear 61b at the teeth k to n, subjected to the positive addendum modification, provided in the preceding rotational region R1 of the first gear 51. This is, the first gear 51 is configured so that the first gear 51 does not stop by engagement of the teeth k to n, subjected to the positive addendum modification, provided in the preceding rotational region R1, with the teeth of the small diameter gear 61b. For that reason, phases of the cam members 28 and 29 are controlled and the teeth k to n provided in the preceding rotational region R1 of the first gear 51 mounted on the rotation shaft 50 of the cam members 28 and 29 which can be controlled are subjected to the positive addendum modification.

Incidentally, a stop position of the second gear (input gear) 61 can also be controlled by mounting a sensor or the like so that a stop phase of the second gear (input gear) 61 can be controlled. When such phase control can be carried out, it is also possible to provide the teeth, subjected to the positive addendum modification in a region corresponding to the preceding rotational region of the second gear (input gear) 61. Further, it is also possible to employ the first gear 51 and the second gear (input gear) 61 each including teeth which correspond to an associated preceding rotational region and which are subjected to the positive addendum modification to some degree.

Part (a) of FIG. 16 is a table showing a particular sheet of the teeth a to j of the first gear 51 shown in part (a) of FIG. 10. Part (b) of FIG. 16 is a table showing a particular sheet of the teeth k to n of the first gear 51 shown in part (a) of FIG. 10. Backlash between each of normal teeth consisting of the teeth a to j, subjected to the cutting of the tooth top 51b1, of the first gear 51 and the associated one of the teeth of the small diameter gear 61b of the second gear (input gear) 61 is 0.15 mm.

As regards an amount of the positive addendum modification of the teeth k to n, subjected to the positive addendum modification, of the first gear 51 in the preceding rotational region R1, an amount of addendum modification of 0.77 mm for each of the teeth k to n, subjected to the positive addendum modification, of the first gear 51 in the preceding rotational region R1 is taken into consideration. Further, an amount of addendum modification of 0.27 mm for each of the teeth a to j, subjected to the cutting of the tooth top 51b1, of the first gear 51 is taken into consideration. The amount of the positive addendum modification of each of the teeth k to n is 0.5 mm (=0.77 mm-0.27 mm) which is a value obtained by subtracting 0.27 mm from 0.77 mm.

For this reason, as regards a designed value of the backlash between each of the thick teeth (the teeth k to n subjected to the positive addendum modification) of the first gear 51 and the associated one of the teeth of the small diameter gear 61b of the second gear (input gear) 61, backlash of 0.15 mm between each of the teeth a to j of the first gear 51 and the associated one of the teeth of the small diameter gear 61b is taken into consideration. Further, an amount of the positive addendum modification of 0.5 mm for each of the teeth k to n, subjected to the positive addendum modification, of the first gear 51 is taken into consideration. The designed value of the backlash is 0.35 mm (=0.15 mm 0.5 mm) which is a value obtained by subtracting 0.5 mm from 0.15 mm. Here, the fixing unit 20 moves 0.5 mm away from the apparatus main assembly 100, and therefore, actual backlash is 0.15 mm.

The teeth k to n, subjected to the positive addendum modification, of the first gear 51 have a normal involute shape in which the tooth top is not cut. The root circle 51f of each of the teeth k to n is cut.

A root circle diameter of each of all the teeth a to n of the first gear 51 is 17.79 mm. Specifically, the root circle of the first gear 51 is the same as the root circle in the case where the first gear 51 is constituted by only the teeth (second teeth) a to j subjected to the cutting of the tooth top 51b1. Also as regards the root circle of each of the teeth k to n, subjected to the positive addendum modification, of the first gear 51, in order to prevent root circle collision, the diameter of the root circle is set at 17.79 mm which is the same diameter as the root circle diameter of each of the teeth a to j of the first gear 51.

Here, the root circle diameter in the case where all the teeth of the first gear 51 are assumed to be constituted by only the teeth a to j is calculated by the following formula 1 by using the number of teeth of 14, a module of 1.5, an amount of addendum modification of 0.27, and a dedendum coefficient of 1.25 which are shown in part (a) of FIG. 16.

Root circle diameter=14×1.5+0.27×2−1.25×1.5× 2=17.79 (mm)  (formula 1)

In the formula 1, 14×1.5=21 (mm) represents a reference pitch circle diameter of the teeth a to j of the first gear 51 shown in part (a) of FIG. 16. To this value, a value (0.27×2) which is twice the addendum modification amount of 0.27 mm of each of the teeth a to j is added, so that a pitch circle diameter of the teeth a to j for which the addendum modification is taken into consideration is acquired. From this pitch circle diameter, a value (1.25×1.5×2) which is obtained by multiplying the dedendum coefficient of 1.25 by the module of 1.5 and by 2 is subtracted, so that the root circle diameter of the teeth a to j can be acquired.

<Measurement of Tooth Thickness>

As regards measurement of a tooth thickness of each of the teeth (second teeth) a to j and each of the teeth (first teeth) k to n of the first gear 51, a base tangent length (base thickness of teeth) is determined so that the teeth and their associated teeth contact each other substantially in the neighborhood of a meshing tooth depth (height). As regards the teeth (second teeth) a to j of the first gear 51 shown in part (a) of FIG. 16, the base thickness of teeth (the thickness of two teeth as measured over the two teeth) when the number of teeth in a sector span is "2" is "7.121 mm". On the other hand, as regards the teeth (first teeth) k to n of the first gear 51 shown in part (b) of FIG. 16, the base thickness of teeth (the thickness of three teeth as measured over the three teeth) when the number of teeth in a sector span is "3" is "11.891 mm".

By using a known calculating formula in combination with the "base thickness of teeth", the "number of teeth in a sector span", the "module" and the "pressure angle", a tooth teeth T2 of each of the teeth (second teeth) a to j is calculated from the associated "base thickness of teeth" in accordance with a formula 2 shown below. Further, a tooth teeth T1 of each of the teeth (first teeth) k to n is calculated from the associated "base thickness of teeth" in accordance with a formula 3 shown below. Incidentally, in the terms of the following formulas 2 and 3, "π×1.5×cos 20°" represents a base (normal) pitch (mm).

$$T2 = 7.121 - (2 - 1) \times \pi \times 1.5 \times \cos 20° = 2.69 \text{ (mm)} \quad \text{(formula 2)}$$

$$T2 = 11.891 - (3 - 1) \times \pi \times 1.5 \times \cos 20° = 3.03 \text{ (mm)} \quad \text{(formula 3)}$$

From the above formulas 2 and 3, the tooth thickness T1 of each of the teeth (first teeth) k to n of the first gear 51 is thicker than the tooth thickness T2 of each of the teeth (second teeth) a to j of the first gear 51.

The first gear 51 of this embodiment includes the teeth (second teeth) a to j and the teeth (first teeth) k to n, but the root circle diameter of the first gear 51 is designed so as to be 17.79 (mm). That is, the root circle diameter is the same as the root circle diameter in the case where all the teeth of the first gear 51 are assumed to be constituted by only the teeth (second teeth) a to j.

Incidentally, in a region other than the preceding rotational region R1 of the first gear 51, not only the teeth (second teeth) a to j subjected to the cutting of the tooth top 51b1 but also teeth having the tooth top similar to the tooth top of the teeth (first teeth) k to n subjected to the positive addendum modification may exist in mixture.

Other Embodiments

In the above-described embodiment, as the drive transmission device 60 between the fixing unit 20 and the apparatus main assembly 100, an example using the first gear 51 on the fixing unit 20 side and the small diameter gear 61b of the second gear 61 on the apparatus main assembly 100 side was described. However, the drive transmission device 60 is also applicable to a connecting portion between the apparatus main assembly 100 and, as another unit, an intermediary transfer unit 11 which is an intermediary transfer member.

Further, an example in which the cam member 28 and the first gear 51 which are provided in the fixing unit 20 are provided on a common rotation shaft 50 was described. As another example, the case where an unshown cam gear is provided on the rotation shaft 50 on which the cam member 28 is provided and the first gear 51 is provided on a rotation shaft different from the rotation shaft 50 will be considered. Further, between the cam gear and the first gear 51, a follower (driven) gear may also be provided. In this case, a gear ratio among the cam gear, the follower gear and the first gear 51 may also be a gear ratio such that speeds of the gears are not reduced so as to coincide with the phase of the cam member 28 or may also be a gear ratio such that the numbers of teeth of these gears provide an integral multiple thereof. The first gear 51 is engaged with the small diameter gear 61b of the second gear 61 provided on the apparatus main assembly 100 side.

According to the present invention, an engaging performance of the gears for transmitting the drive (driving force) to the cam capable of changing the pressed state between the two members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-095484 filed on May 12, 2017 and 2018-027517 filed on Feb. 20, 2018, which are hereby incorporated by reference herein in their entirety.

What is claimed is:

1. A drive transmission device comprising:
a first gear;
a cam configured to rotate in interrelation with rotation of said first gear and capable of changing a state of two members between a first state in which the two members are biased with a first pressure and a second state in which the two members are biased with a second pressure smaller than the first pressure;
a pressing member configured to press said cam; and
a second gear configured to transmit a driving force to said first gear in engagement with said first gear,
wherein at least one of said first gear and said second gear includes (i) a plurality of first teeth provided at positions corresponding to an engaging region in which said first gear is engaged with said second gear when the state of the two members is changed from the second state to the first state and (ii) a plurality of second teeth provided at positions corresponding to a region other than said engaging region, and
wherein tooth thicknesses of said first teeth are thicker than tooth thicknesses of said second teeth.

2. A drive transmission device according to claim 1, wherein a positive amount of addendum modification of said first teeth is larger than a positive amount of addendum modification of said second teeth.

3. A drive transmission device according to claim 1, wherein said first gear includes a root circle, the root circle of said first gear being the same as a root circle if said first gear was constituted only by said second teeth.

4. A drive transmission device according to claim 1, wherein at least one of said first gear and said second gear has an involute shape.

5. A drive transmission device according to claim 1, wherein said engaging region is a region in which said first gear rotates in advance and then engages with said second gear when the state of the two members is changed from the second state to the first state by said cam.

6. A drive transmission device according to claim 5, wherein a rotation angle of said engaging region until said first gear rotates in advance and then engages with said second gear is 80° to 100°.

7. A drive transmission device according to claim 1, wherein said first gear is provided coaxially with said cam.

8. A drive transmission device according to claim 1, wherein when said second teeth are normal teeth, and said first teeth are teeth subjected to positive addendum modification.

9. A drive transmission device comprising:
a first gear;
a cam configured to rotate in interrelation with rotation of said first gear and capable of changing a state of two members between a first state in which the two members are biased with a first pressure and a second state in which two members are biased with a second pressure smaller than the first pressure;
a pressing member configured to press said cam; and
a second gear configured to transmit a driving force to said first gear in engagement with said first gear,
wherein at least one of said first gear and said second gear includes (i) a plurality of first teeth provided at positions corresponding to an engaging region in which said first gear is engaged with said second gear when the state of the two members is changed from the second state to the first state and (ii) a plurality of second teeth provided at positions corresponding to a region other than said engaging region, and
wherein backlash between one of said first teeth and an associated tooth of said second gear is smaller than backlash between one of said second teeth and an associated tooth of said second gear.

10. A drive transmission device according to claim 9, wherein a positive amount of addendum modification of said first teeth is larger than a positive amount of addendum modification of said second teeth.

11. A drive transmission device according to claim 9, wherein said first gear includes a root circle, the root circle of said first gear being the same as a root circle if said first gear was constituted only by said second teeth.

12. A drive transmission device according to claim 9, wherein at least one of said first gear and said second gear has an involute shape.

13. A drive transmission device according to claim 9, wherein said engaging region is a region in which said first gear rotates in advance and then engages with said second gear when the state of the two members are changed from the second state to the first state by said cam.

14. A drive transmission device according to claim 13, wherein a rotation angle of said engaging region until said first gear rotates in advance and then engages with said second gear is 80° to 100°.

15. An image forming apparatus including a mounting and demounting unit detachably mountable to a main assembly of said image forming apparatus, wherein said mounting and demounting unit includes,
a first gear,
a cam configured to rotate in interrelation with rotation of said first gear and capable of changing a state of two members between a first state in which the two members are biased with a first pressure and a second state in which the two members are biased with a second pressure smaller than the first pressure, and
a pressing member configured to press said cam; and
wherein said main assembly includes a second gear configured to transmit a driving force to said first gear in engagement with said first gear,
wherein at least one of said first gear and said second gear includes (i) a plurality of first teeth provided at positions corresponding to an engaging region in which said first gear is engaged with said second gear when the state of the two members is changed from the second state to the first state and (ii) a plurality of second teeth provided at positions corresponding to a region other than said engaging region, and
wherein tooth thicknesses of said first teeth are thicker than tooth thicknesses of said second teeth.

16. An image forming apparatus according to claim 15, wherein when said first teeth receive a reaction force from teeth of said second gear, said first teeth of said first gear are subjected to positive addendum modification corresponding to backlash in which movement of said mounting and demounting unit is received by said main assembly.

17. An image forming apparatus according to claim 15, wherein at least one of said first gear and said second gear has an involute shape.

18. An image forming apparatus according to claim 15, wherein said mounting and demounting unit is a fixing unit.

19. An image forming apparatus according to claim 15, wherein said engaging region is a region in which said first gear rotates in advance and then engages with said second gear when the state of the two members are changed from the second state to the first state by said cam.

20. An image forming apparatus including a mounting and demounting unit detachably mountable to a main assembly of said image forming apparatus, wherein said mounting and demounting unit includes,
a first gear,
a cam configured to rotate in interrelation with rotation of said first gear and capable of changing a state of two members between a first state in which the two members are biased with a first pressure and a second state in which two members are biased with a second pressure smaller than the first pressure, and
a pressing member configured to press said cam, and
wherein said main assembly includes a second gear configured to transmit a driving force to said first gear in engagement with said first gear,
wherein at least one of said first gear and said second gear includes (i) a plurality of first teeth provided at positions corresponding to an engaging region in which said first gear is engaged with said second gear when the state of the two members is changed from the second state to the first state and (ii) a plurality of second teeth provided at positions corresponding to a region other than said engaging region, and
wherein backlash between one of said first teeth and an associated tooth of said second gear is smaller than backlash between one of said second teeth and an associated tooth of said second gear.

* * * * *